United States Patent
Ota

(10) Patent No.: US 10,652,453 B2
(45) Date of Patent: May 12, 2020

(54) ELECTRONIC APPARATUS AND CONTROL METHOD THEREOF

(71) Applicant: CANON KABUSHIKI KAISHA, Tokyo (JP)

(72) Inventor: Tomohiro Ota, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/373,812

(22) Filed: Apr. 3, 2019

(65) Prior Publication Data
US 2019/0313033 A1 Oct. 10, 2019

(30) Foreign Application Priority Data
Apr. 9, 2018 (JP) .................................. 2018-074987

(51) Int. Cl.
*H04N 5/232* (2006.01)
(52) U.S. Cl.
CPC ... *H04N 5/232127* (2018.08); *H04N 5/23216* (2013.01); *H04N 5/23293* (2013.01)
(58) Field of Classification Search
CPC ......... H04N 5/232127; H04N 5/23216; H04N 5/23293
See application file for complete search history.

(56) References Cited

U.S. PATENT DOCUMENTS

| | | | | |
|---|---|---|---|---|
| 2004/0201767 A1* | 10/2004 | Niikawa | ............ | H04N 5/23212 348/333.03 |
| 2006/0050151 A1* | 3/2006 | Fujinawa | ............ | H04N 1/00442 348/207.99 |
| 2013/0083222 A1* | 4/2013 | Matsuzawa | ........ | H04N 5/23212 348/240.3 |
| 2015/0201122 A1* | 7/2015 | Ooba | ................. | H04N 5/23293 348/333.05 |
| 2015/0381883 A1* | 12/2015 | Kawai | ................ | H04N 5/23293 348/333.08 |
| 2016/0295100 A1* | 10/2016 | Yokozeki | ............ | H04N 5/23212 |
| 2016/0295120 A1* | 10/2016 | Ota | .................... | H04N 5/23245 |

FOREIGN PATENT DOCUMENTS

JP 2016-197182 A 11/2016

* cited by examiner

*Primary Examiner* — Timothy J Henn
(74) *Attorney, Agent, or Firm* — Cowan, Liebowitz & Latman, P.C.

(57) ABSTRACT

An apparatus, if a live view image is not displayed in an enlarged manner on first and second display units, outputs, to the first and second display units, an image acquired by superimposing a guide indicating a degree of focus of a focus detection region, on the live view image, and if a live view image is displayed in an enlarged manner on the first display unit, outputs, to the first display unit, an image acquired by enlarging a partial region in the live view image that includes the focus detection region and superimposing the guide on the enlarged image, and outputs, to the second display unit, the live view image on which the guide is not superimposed.

20 Claims, 16 Drawing Sheets

FIG. 2A

PIXEL CONFIGURATION FOR NON-IMAGE PLANE PHASE DIFFERENCE DETECTION

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG. 2B

PIXEL CONFIGURATION FOR IMAGE PLANE PHASE DIFFERENCE DETECTION

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

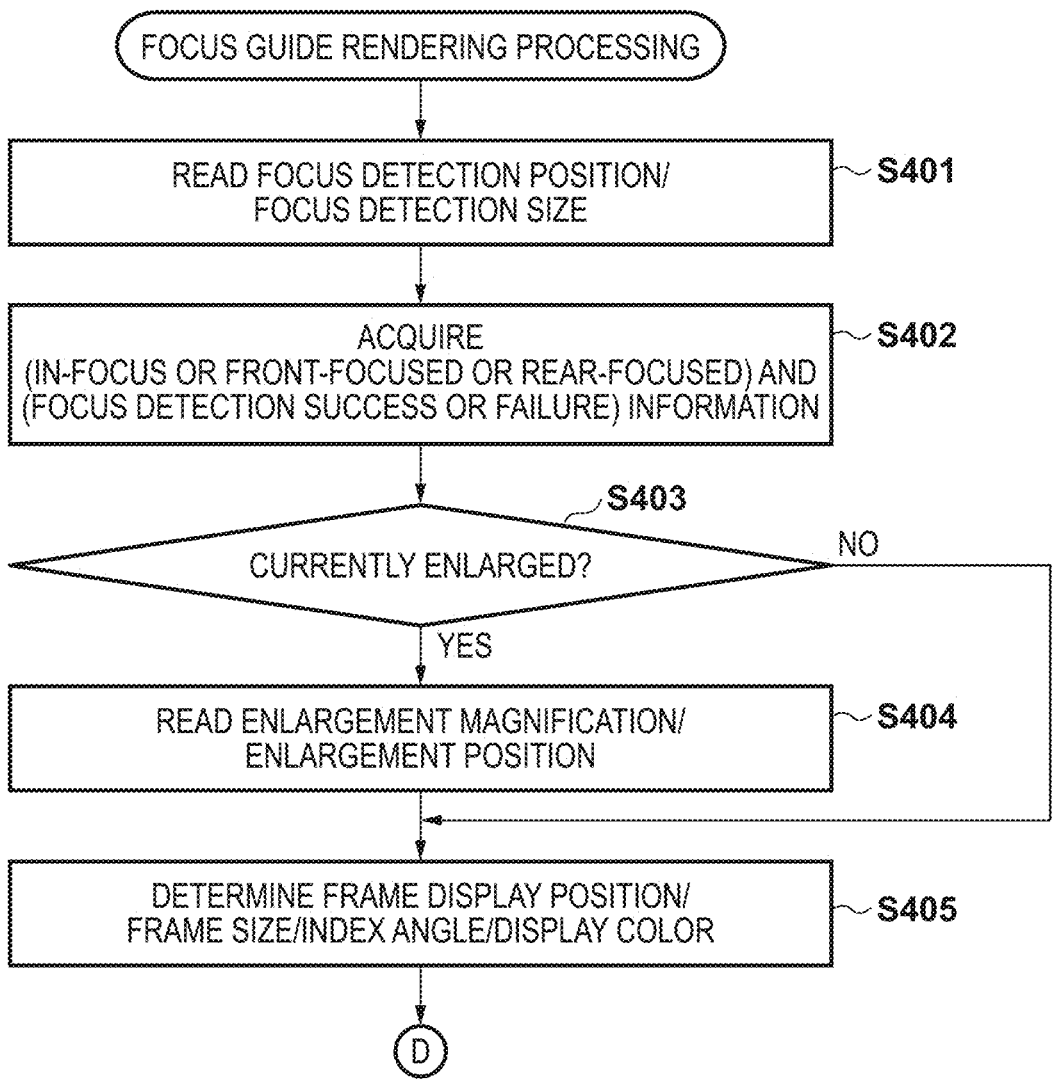

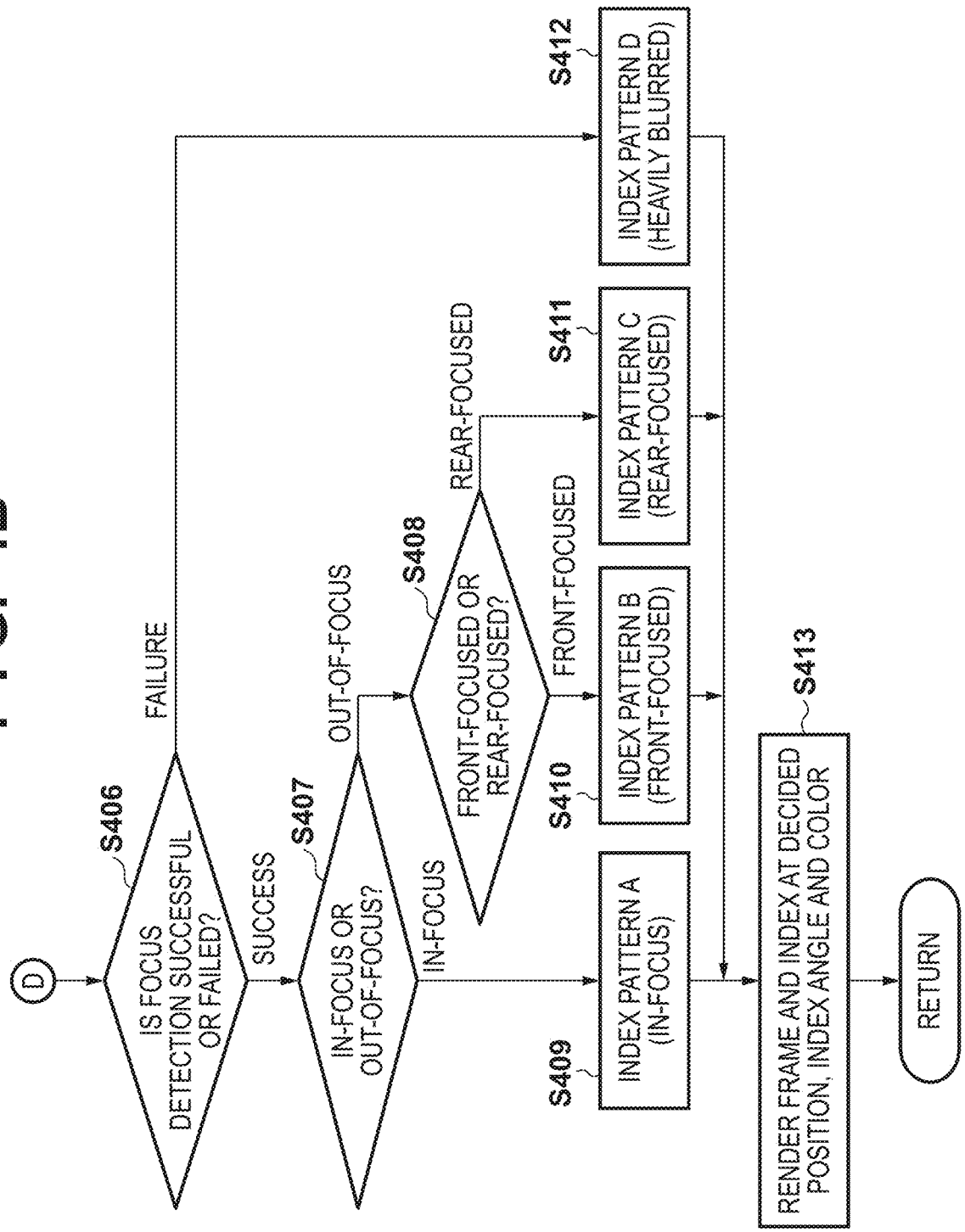

FIG. 6B1 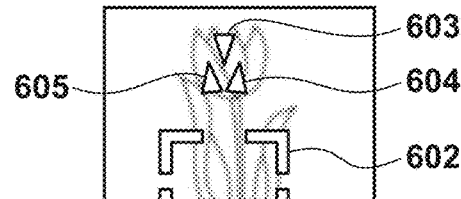
FIG. 6B2 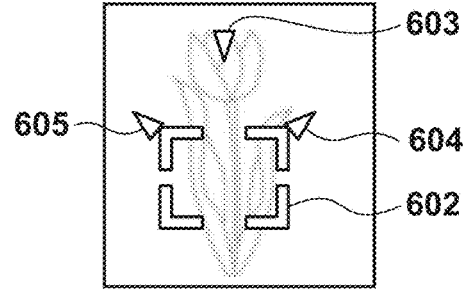
FIG. 6C1 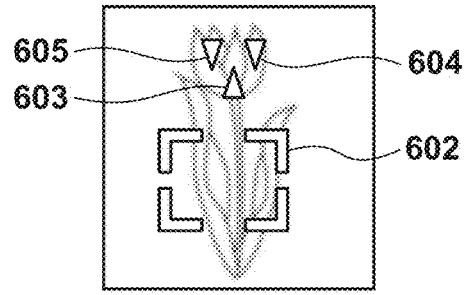
FIG. 6C2 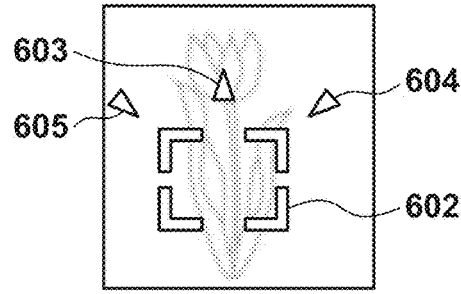

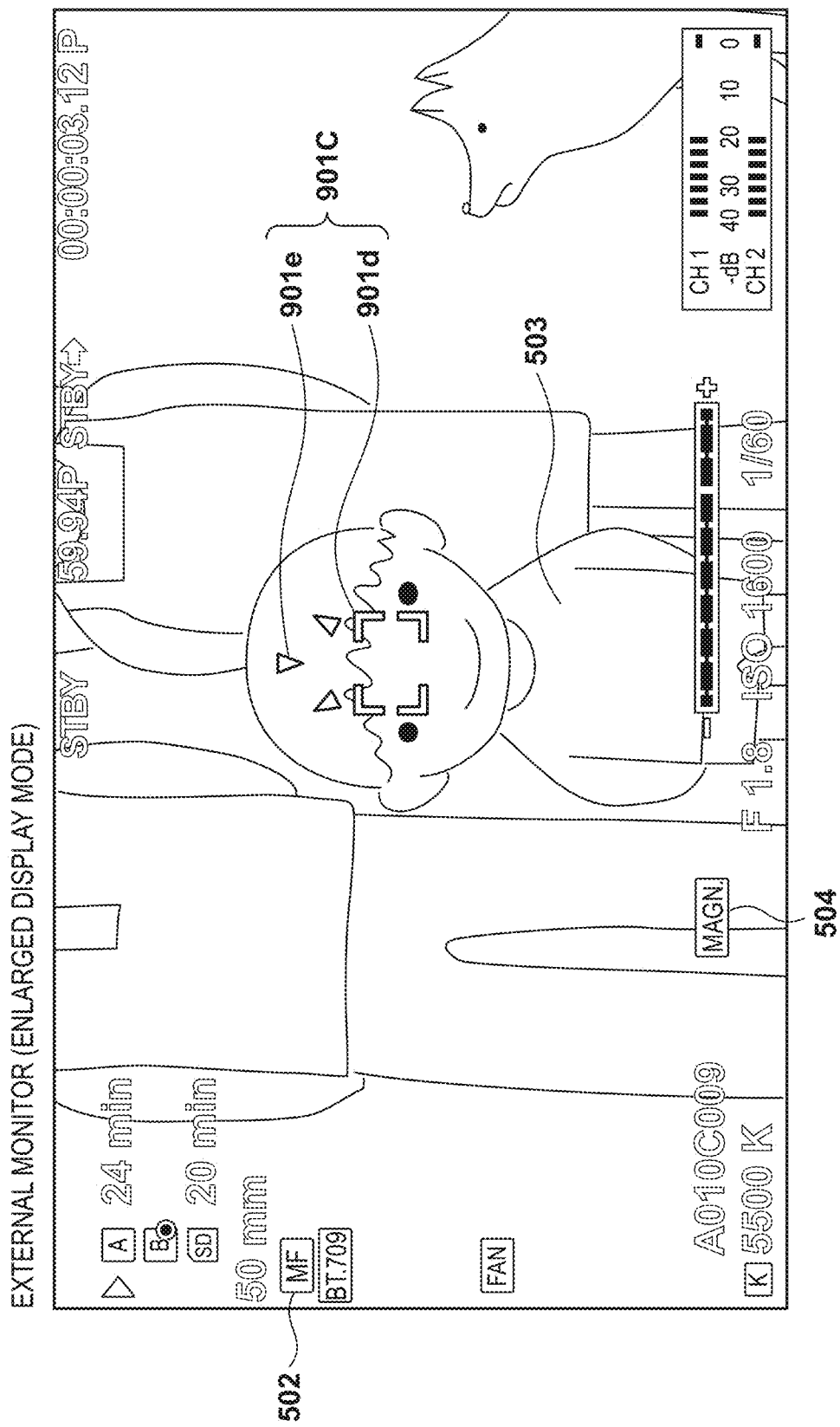

ELECTRONIC APPARATUS AND CONTROL METHOD THEREOF

BACKGROUND OF THE INVENTION

Field of the Invention

The present invention relates to a technique of a display control of a focus guide for allowing a user to perform focus adjustment.

Description of the Related Art

Electronic apparatuses such as digital still cameras and digital video cameras have a focus guide function that allows the user to easily perform a manual focus adjustment operation. The focus guide function includes a function for displaying a portion of a live view image in an enlarged manner or a function for superimposing and displaying, on a live view image, a focus guide indicating the degree of focus in any region.

Japanese Patent Laid-Open No. 2016-197182 discloses performing control so as to change the display appearance of a guide that is superimposed on a live view image according to the display magnification of the live view image, and thereby fit a guide within a display region during enlarged display of the live view image.

Some digital still cameras and digital video cameras can output a live view image to a plurality of display devices at the same time. For example, at a video image production site, a usage case is envisioned in which, such a plurality of image output devices are used to allow a focus puller to perform focus adjustment using an external monitor and a photographer to determine the layout using a viewfinder included in the camera. In such a case, enlarged display is performed only on the external monitor in most cases, and it is desirable that a focus guide that is displayed at the same time is more effective in the external monitor on which enlarged display is performed.

SUMMARY OF THE INVENTION

The present invention has been made in consideration of the aforementioned problems, and realizes techniques that make it possible to display a focus guide on at least an image output device on which enlarged display is performed from among a plurality of image output devices.

In order to solve the aforementioned problems, the present invention provides an electronic apparatus comprising: a first output unit configured to output an image to a first display unit; a second output unit configured to output an image to a second display unit; and a memory and at least one processor and/or at least one circuit to perform the operations of a control unit, wherein the control unit is configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and if a live view image is displayed in an enlarged manner on the first display unit, perform control so as to output, to the first display unit, an image acquired by enlarging a partial region in the live view image that includes the focus detection region and superimposing the guide on the enlarged image, and output, to the second display unit, the live view image on which the guide is not superimposed.

In order to solve the aforementioned problems, the present invention provides an electronic apparatus comprising: a first output unit configured to output an image to a first display unit; a second output unit configured to output an image to a second display unit; and a memory and at least one processor and/or at least one circuit to perform the operations of a control unit, wherein the control unit is configured to, if a live view image is not displayed in an enlarged manner on the first display unit and the second display unit, perform control so as to output, to both the first display unit and the second display unit, an image acquired by superimposing, on the live view image, a guide indicating a degree of focus of a focus detection region of a first size, and if a live view image is displayed in an enlarged manner on the first display unit, perform control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

In order to solve the aforementioned problems, the present invention provides an electronic apparatus comprising: a first output unit configured to output an image to a first display unit; a second output unit configured to output an image to a second display unit; and a memory and at least one processor and/or at least one circuit to perform the operations of a control unit, wherein the control unit is configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and if the live view image is displayed in an enlarged manner on the first display unit, perform control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

In order to solve the aforementioned problems, the present invention provides a method of controlling an electronic apparatus having a first output unit configured to output an image to a first display unit and a second output unit configured to output an image to a second display unit, the method comprising: if a live view image is not displayed in an enlarged manner on the first display unit and the second display unit, performing control so as to output, to both the first display unit and the second display unit, an image acquired by superimposing a guide indicating a degree of focus of a focus detection region, on the live view image; and if a live view image is displayed in an enlarged manner on the first display unit, performing control so as to output, to the first display unit, an image acquired by enlarging a partial region in the live view image that includes the focus detection region and superimposing the guide on the enlarged image, and output, to the second display unit, the live view image on which the guide is not superimposed.

In order to solve the aforementioned problems, the present invention provides a method of controlling an electronic apparatus having a first output unit configured to output an image to a first display unit and a second output unit configured to output an image to a second display unit, the method comprising: if a live view image is not displayed in an enlarged manner on the first display unit and the second display unit, performing control so as to output, to both the first display unit and the second display unit, an image acquired by superimposing, on the live view image, a guide indicating a degree of focus of a focus detection region of a first size; and if a live view image is displayed in an enlarged manner on the first display unit, performing control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

In order to solve the aforementioned problems, the present invention provides a method of controlling an electronic apparatus having a first output unit configured to output an image to a first display unit and a second output unit configured to output an image to a second display unit, the method comprising: if a live view image is not displayed in an enlarged manner on the first display unit and the second display unit, performing control so as to output, to both the first display unit and the second display unit, an image acquired by superimposing a guide indicating a degree of focus of a focus detection region, on the live view image; and if the live view image is displayed in an enlarged manner on the first display unit, performing control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

In order to solve the aforementioned problems, the present invention provides a non-transitory computer-readable storage medium storing a program for causing a computer to function as an electronic apparatus comprising: a first output unit configured to output an image to a first display unit; a second output unit configured to output an image to a second display unit; and a control unit configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and if a live view image is displayed in an enlarged manner on the first display unit, perform control so as to output, to the first display unit, an image acquired by enlarging a partial region in the live view image that includes the focus detection region and superimposing the guide on the enlarged image, and output, to the second display unit, the live view image on which the guide is not superimposed.

In order to solve the aforementioned problems, the present invention provides a non-transitory computer-readable storage medium storing a program for causing a computer to function as an electronic apparatus comprising: a first output unit configured to output an image to a first display unit; a second output unit configured to output an image to a second display unit; and a control unit configured to, if a live view image is not displayed in an enlarged manner on the first display unit and the second display unit, perform control so as to output, to both the first display unit and the second display unit, an image acquired by superimposing, on the live view image, a guide indicating a degree of focus of a focus detection region of a first size, and if a live view image is displayed in an enlarged manner on the first display unit, perform control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

In order to solve the aforementioned problems, the present invention provides a non-transitory computer-readable storage medium storing a program for causing a computer to function as an electronic apparatus comprising: a first output unit configured to output an image to a first display unit; a second output unit configured to output an image to a second display unit; and a control unit configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and if the live view image is displayed in an enlarged manner on the first display unit, perform control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

According to the present invention, it is possible to display a focus guide on at least an image output device on which enlarged display is performed from among a plurality of image output devices.

Further features of the present invention will become apparent from the following description of exemplary embodiments (with reference to the attached drawings).

BRIEF DESCRIPTION OF THE DRAWINGS

FIGS. 2A and 2B are diagrams illustrating a light receiving surface of an image capturing element.

FIGS. 4A and 4B are flowcharts showing focus guide rendering processing of FIG. 3B.

FIGS. 6A, 6B1, 6B2, 6C1, 6C2, and 6D are diagrams showing a display example of data of a frame and indexes.

FIGS. 9A to 9C show examples of display screens according to the second embodiment.

DESCRIPTION OF THE EMBODIMENTS

Embodiments in which an electronic apparatus of the present invention is applied to an image capturing apparatus such as a digital camera that can shoot still images and moving images will be described below in detail with reference to the accompanying drawings.

First Embodiment

Hardware Configuration

Figure 1:
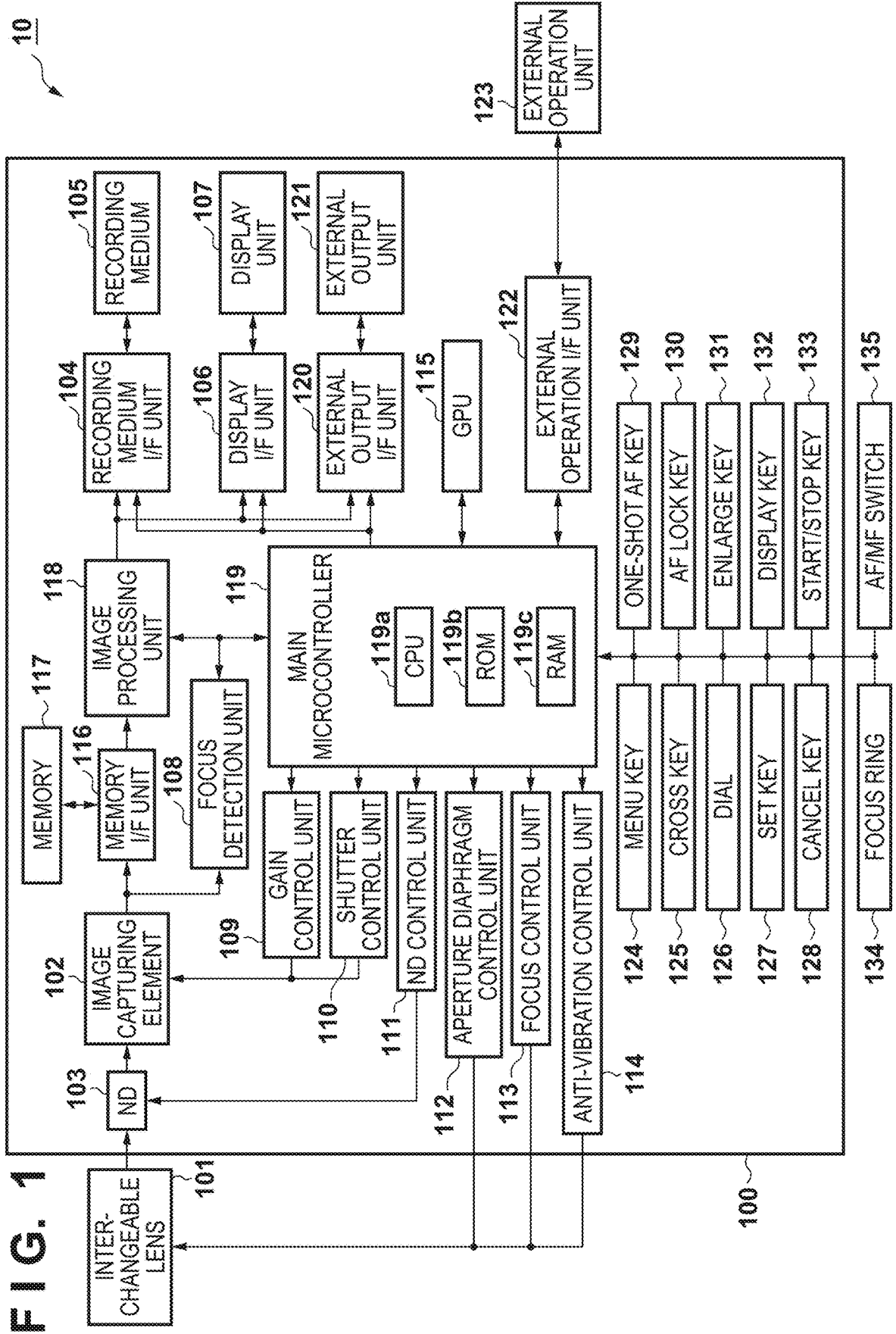
FIG. 1 is a block diagram showing a configuration of a digital camera.

FIG. 1 shows an example of a hardware configuration of a digital camera 10 that is an example of an electronic apparatus according to the present invention.

A housing 100 is an outer jacket enclosing many constituent elements of the digital camera 10, and various types of operation units, a display unit 107 and an external output unit 121 are exposed on the surface of the housing 100.

An interchangeable lens 101 is a photographing lens composed of a plurality of lens groups, and is internally provided with a focus lens, a zoom lens and a shift lens, as well as an aperture diaphragm.

An image capturing element (image sensor) 102 has a configuration in which a plurality of pixels, each including a photoelectric conversion element, are two-dimensionally arranged. In the image capturing element 102, an optical image of an object formed by the interchangeable lens 101 is photoelectrically converted by the pixels, and is further subjected to analog/digital conversion by an A/D converter circuit so as to output an image signal (RAW image data) per pixel. A detailed description of the image capturing element 102 used in the present embodiment and a relevant focus detection unit 108 will be given later with reference to FIGS. 2A and 2B.

An ND filter 103 is provided in the digital camera 10 in order to adjust the amount of incident light, separately from the aperture diaphragm provided in the lens.

An image processing unit 118 corrects a level difference caused by the image capturing element 102. For example, the image processing unit 118 corrects the level of pixels in a valid region by using the pixels in an OB (optical black) region, as well as performing correction on a defective pixel by using the pixels surrounding the defective pixel. The image processing unit 118 also performs various processing operations such as correction of light fall-off at the edge of a frame, color correction, edge enhancement, noise removal, gamma correction, debayering, and compression. After performing the above processing on RAW image data input from the image capturing element 102, the image processing unit 118 outputs corrected image data to other blocks.

A recording medium I/F unit 104 is an interface between a recording medium 105 and the digital camera 10, and is configured to perform control of recording of image data input from the image processing unit 118 into the recording medium 105 and control of reading the recorded image data.

The recording medium 105 is a recording medium including a semiconductor memory or the like for recording a captured image data, and is configured to record image data and read recorded image data in response to control by the recording medium I/F unit 104. The recording medium 105 is a removable memory card or the like, but may be a built-in recording medium in the camera.

A GPU 115 is a rendering engine that renders various types of information display and menu screens of the digital camera 10 in a VRAM. The GPU 115 has, in addition to a rendering function of rendering character strings and graphics, a scale-up/down rendering function, a rotational rendering function and a layer composition function. The VRAM used for rendering includes an alpha channel that represents a transmittance, and the rendered content can be displayed on a video image (a captured image or a reproduced image) in an on-screen display (OSD) manner by a display I/F unit 106.

The display I/F unit 106 performs superimposition/composition processing and resize processing on the image data (including a live view image) from the image processing unit 118 and the display content rendered into the VRAM by the GPU 115, and then outputs (displays) the resultant to (on) the display unit 107. In the case where an enlarged display mode is set, the display I/F unit 106 performs superimposition/composition processing and resize processing on a partial region of the image data. As a result, in the enlarged display mode, an enlarged image larger than that in the normal (non-scaled/equal magnification) mode is displayed on the display unit 107, which allows the user to perform focus adjusting operation (focus operation) during manual focus with higher accuracy.

The display unit 107 can be a built-in monitor that displays the image data output from the display I/F unit 106, and that is attached to the housing 100, or a display unit provided within the viewfinder. The display unit 107 may be a liquid crystal display or an organic EL display (organic light-emitting diode display) or the like.

A main microcontroller 119 is a control unit that controls the entire operation of the digital camera 10, and can be a microcomputer or the like. The main microcontroller 119 includes a CPU 119a, a ROM 119b and a RAM 119c. The CPU 119a executes the operations of various types of flowcharts, which will be described later, by extracting a program stored in the ROM 119b into the RAM 119c and executing the program. The RAM 119c includes the VRAM to be rendered by the GPU 115.

A gain control unit 109, a shutter control unit 110, an ND control unit 111 and an aperture diaphragm control unit 112, which will be described below, are functional blocks for exposure control. These units are controlled by the main microcontroller 119 based on a result of calculation of the brightness level of each piece of image data output from the image processing unit 118, the calculation being performed by the main microcontroller 119, or based on operating parameters manually set by the photographer.

The gain control unit 109 controls the gain of the image capturing element 102. The shutter control unit 110 controls the shutter speed of the image capturing element 102. The ND control unit 111 controls the amount of light incident on the image capturing element 102 via the ND filter 103. The aperture diaphragm control unit 112 controls the aperture diaphragm of the interchangeable lens 101.

A focus control unit 113 performs different operations depending on whether the focus control mode stored in the main microcontroller 119 is set to an autofocus mode (hereinafter also referred to as AF mode) or a manual focus mode (hereinafter also referred to as MF mode).

In the case of the AF mode, the main microcontroller 119 calculates focusing information by referencing to the image data output from the image processing unit 118, and the focus control unit 113 controls the focus lens provided in the interchangeable lens 101 based on the calculated focusing information. Alternatively, the focus control unit 113 controls the focus lens provided in the interchangeable lens 101 based on the amount of defocus output from the focus detection unit 108 by an image plane phase difference detection scheme.

The focusing information may be calculated based on only an object within an AF frame set in a partial region of the image data. The AF mode further includes two operation modes depending on the processing executed by the main microcontroller 119. One is a one-shot AF mode in which AF control is performed only when a one-shot AF key 129 is pressed, and the AF control of the focus control unit 113 is terminated after it is determined whether or not focusing is successful. The other mode is a continuous AF mode (servo AF) in which AF control is constantly performed. However, even in the continuous AF mode, the AF control of the focus control unit 113 is terminated when an AF locked state is set by an AF lock key 130 being pressed. These two AF modes described above can be switched by a settings change operation performed on a menu screen.

In the case of the MF mode, the focus control unit 113 terminates AF control. Then, when the user manually rotates a focus ring 134 provided on the interchangeable lens 101, an arbitrary focus adjusting operation can be performed on an area surrounded by a focus detection area (focus frame) in the image data.

An anti-vibration control unit 114 calculates motion vectors of an object by using the main microcontroller 119 by referencing to the image data output from the image processing unit 118, and performs optical anti-vibration processing for controlling the shift lens included in the interchangeable lens 101 so as to compensate for camera shake by hands based on the calculated motion vectors. Alternatively, the anti-vibration control unit 114 performs electronic anti-vibration processing for cutting out an image in each frame of a moving image in a direction in which image blur caused by camera shake by hands is compensated.

A memory I/F (interface) unit 116 writes, into a memory 117, all pixels' worth of RAW image data output from the image capturing element 102, and reads out the RAW image data stored in the memory 117 so as to output the read RAW image data to the image processing unit 118.

The memory 117 is a volatile storage medium having a capacity capable of storing all pixels' worth of RAW image data of several frames.

The image processing unit 118 performs image processing necessary to perform control on all pixels' worth of RAW image data transmitted from the memory I/F unit 116.

An external output I/F unit 120 performs resize processing on the video data generated by the image processing unit 118. Also, the external output I/F unit 120 performs signal conversion to obtain a signal that conforms to the specification of the external output unit 121 as well as application of a control signal, and outputs the resultant to the external output unit 121. Also, similar to the display I/F unit 106, the external output I/F unit 120 can superimpose and compose data rendered in the VRAM by the GPU 115 on the image data.

The external output unit 121 is a terminal that externally outputs video data, and can be, for example, a SDI (serial digital interface) terminal or a HDMI® (high-definition multimedia interface) terminal. The external output unit 121 can be connected to external apparatuses such as a monitor display and an external recording apparatus.

An external operation I/F unit 122 is a functional module that receives a control instruction from an external operation unit 123 and notifies the main microcontroller 119 of the control instruction, and can be, for example, an infrared remote control light-receiving unit, a wireless LAN (local area network) interface or LANC® (local application control bus system).

The external operation unit 123 transmits a control instruction (control command) to the external operation I/F unit 122. The external operation unit 123 is capable of transmitting instructions (commands) corresponding to the operations of operation units 124 to 135 included in the housing 100 and the interchangeable lens 101, as well as transmitting settings change information on the menu screen displayed on the display unit 107.

The operation units 124 to 135 are operation members such as a key (button), a dial, a tactile switch and a ring. Also, the operation units 124 to 135 include a touch panel that can detect a touch on the display unit 107. These operation units have a function of accepting a user operation and notifying the main microcontroller 119 of a control instruction. The menu key 124 to the START/STOP key 133 are operation units on the main body side provided in the housing 100. The focus ring 134 and the AF/MF switch 135 are lens-side operation units provided on the interchangeable lens 101. Some of the operation units may exchange their key functions or may have other functions assigned thereto depending on the change in the settings on the menu screen.

The menu key 124 provides an instruction to display a menu screen on the display unit 107 or an instruction to close the menu screen already displayed on the display unit 107.

The cross key 125 and the dial 126 both provide an instruction to move a cursor for selecting an item on the menu screen, or an instruction to move the display position of a focus frame in a direction designated by the user. The cross key 125 is a directional pad composed of an up key, a down key, a left key and a right key, which may be separate operation members or may be configured as a single operation member such that an instruction to move in any one of up, down, right and left directions can be provided depending on the pressed position. The dial 126 is a rotational operation member that can be turned clockwise and counterclockwise.

The SET key 127 is used to select an item pointed to by the cursor on the menu screen or provide an instruction to enter any setting operation.

The cancel key 128 is used to provide an instruction to move back to the immediately preceding hierarchy level while a deep hierarchy level is selected on the menu screen or an instruction to discard any setting operation.

The one-shot AF key 129 is used to provide an instruction to cause the focus control unit 113 to execute an AF operation when the AF mode is set to the one-shot AF.

The AF lock key 130 is used to provide a termination instruction to terminate the AF control performed by the focus control unit 113 when the AF mode is set to the continuous AF mode, and a release instruction to release the terminated state.

The enlarge key 131 is used to provide an instruction to change the enlargement magnification of an image that is displayed on the display unit 107. An instruction to increase the enlargement magnification is performed every time the enlarge key 131 is pressed, and an instruction to return the enlargement magnification to non-magnification is performed when the enlarge key 131 is pressed a predetermined number of times.

The display key 132 is used to provide an instruction to change the setting of a Disp level held in the main microcontroller 119. The user can limit various types of information displayed on the display unit 107, display more detailed information, and display images in more detail, by selecting a Disp level. The Disp level can be used to set, in a plurality of different levels, a level of detail at which various types of information are to be superimposed and displayed on an image, which type of information is to be displayed, and the like.

The start/stop key 133 is used to provide an instruction to start or stop recording of the recording medium I/F unit 104.

The focus ring 134 allows the user to manually move the focus lens in the interchangeable lens 101 to perform a focus adjusting operation when the focus control mode is set to the MF mode.

The AF/MF switch 135 is used to provide an instruction to switch the focus control mode between the AF mode and the MF mode.

Image Plane Phase Difference Detection

FIGS. 2A and 2B show a part of the light receiving surface of the image capturing element 102 serving as an image sensor.

The image capturing element 102 includes, in order to enable image plane phase difference AF, pixel portions that are arranged in an array, each pixel portion including one micro-lens and two photodiodes, which are light receiving portions serving as photoelectric conversion units. With this configuration, each pixel portion can receive bundles of rays that have undergone division of the exit pupil of the interchangeable lens 101.

FIG. 2A is a schematic diagram showing a part of the surface of an image sensor having a Bayer arrangement of a red (R) pixel, a blue (B) pixel and green pixels (Gb, Gr), which is shown as a reference. FIG. 2B shows pixel portions, each including one micro-lens and two photodiodes serving as photoelectric conversion units, which are shown so as to correspond to the color filter arrangement shown in FIG. 2A.

The image sensor having the above configuration is configured so as to be capable of outputting two phase difference detection signals (hereinafter also referred to as image signal A and image signal B) from each pixel portion. Also, the image sensor is capable of outputting a captured image recording signal (the image signal A+the image signal B) obtained by adding the signals of two photodiodes. In the case of the signal obtained by adding the signals, a signal that is equivalent to the output of the image sensor having a Bayer arrangement briefly described with reference to FIG. 2A is output.

The focus detection unit 108 performs correlation calculation of two image signals by using the output signal from the image capturing element 102, serving as an image sensor as described above, so as to calculate various types of information such as the amount of defocus and reliability. The amount of defocus refers to the amount of defocus on the image plane calculated based on a deviation between the image signal A and the image signal B. The amount of defocus has positive and negative values, and it is possible to determine whether the state is a front-focused state or a rear-focused state depending on whether the amount of defocus has a positive value or a negative value. It is also possible to determine a degree of focus by using the absolute value of the amount of defocus. If the amount of defocus is 0, it is determined that the focusing state is an in-focus state. That is, the focus detection unit 108 outputs, to the CPU 119a of the main microcontroller 119 and the like, information indicating that the state is a front-focused state or a rear-focused state obtained based on whether the amount of defocus calculated with respect to focus detection information (focus detection position, focus detection region (size), focal point detection position and focal point detection region) takes a positive value or a negative value. Also, the focus detection unit 108 outputs, to the CPU 119a and the like, information (information indicating an in-focus state) indicating the degree of focus (the degree of out-of-focus) obtained based on the absolute value of the amount of defocus. Also, the focus detection unit 108 outputs the information indicating that the state is a front-focused state or a rear-focused state if it is determined that the amount of defocus exceeds a predetermined value, and outputs the information indicating that the state is an in-focus state if it is determined that the absolute value of the amount of defocus is less than or equal to a predetermined value. The information indicating the degree of focus is output as a value obtained by converting the amount of defocus to the amount of operation required to rotate the focus ring 134 until an in-focus state is achieved.

The image capturing element 102 according to the present embodiment outputs a total of three signals: an image capturing signal and two phase difference detection signals, but the configuration is not limited thereto. For example, the image capturing element 102 may be configured to output a total of two signals: an image capturing signal and one of a pair of phase difference detection image signals. In this case, the other one of the pair of phase difference detection image signals is calculated by using two output signals from the image capturing element 102 after output.

Also, in the example shown in FIG. 2B, pixel portions, each including one micro-lens and two photodiodes serving as photoelectric conversion units, are arranged in an array, but a configuration is also possible in which pixel portions, each including one micro-lens and three or more photodiodes serving as photoelectric conversion units, are arranged in an array. Also, a plurality of pixel portions may be provided, each pixel portion having a different opening position of a light-receiving portion with respect to the micro-lens. That is, it is sufficient if it is possible to, as a consequence, acquire two phase difference detection signals capable of phase difference detection such as an image signal A and an image signal B.

FIGS. 3A, 3B, 4A, and 4B are flowcharts illustrating shooting mode processing performed by the digital camera 10. The operations of the flowcharts are implemented by the main microcontroller 119 (to be specific, the CPU 119a) extracting a program stored in the ROM 119b into the RAM 119c and the CPU 119a controlling the constituent elements of the digital camera 10 based on the program. This also applies to FIGS. 7A, 7B, and 8 to be described later.

Focus Guide Display Processing

Figure 3A:
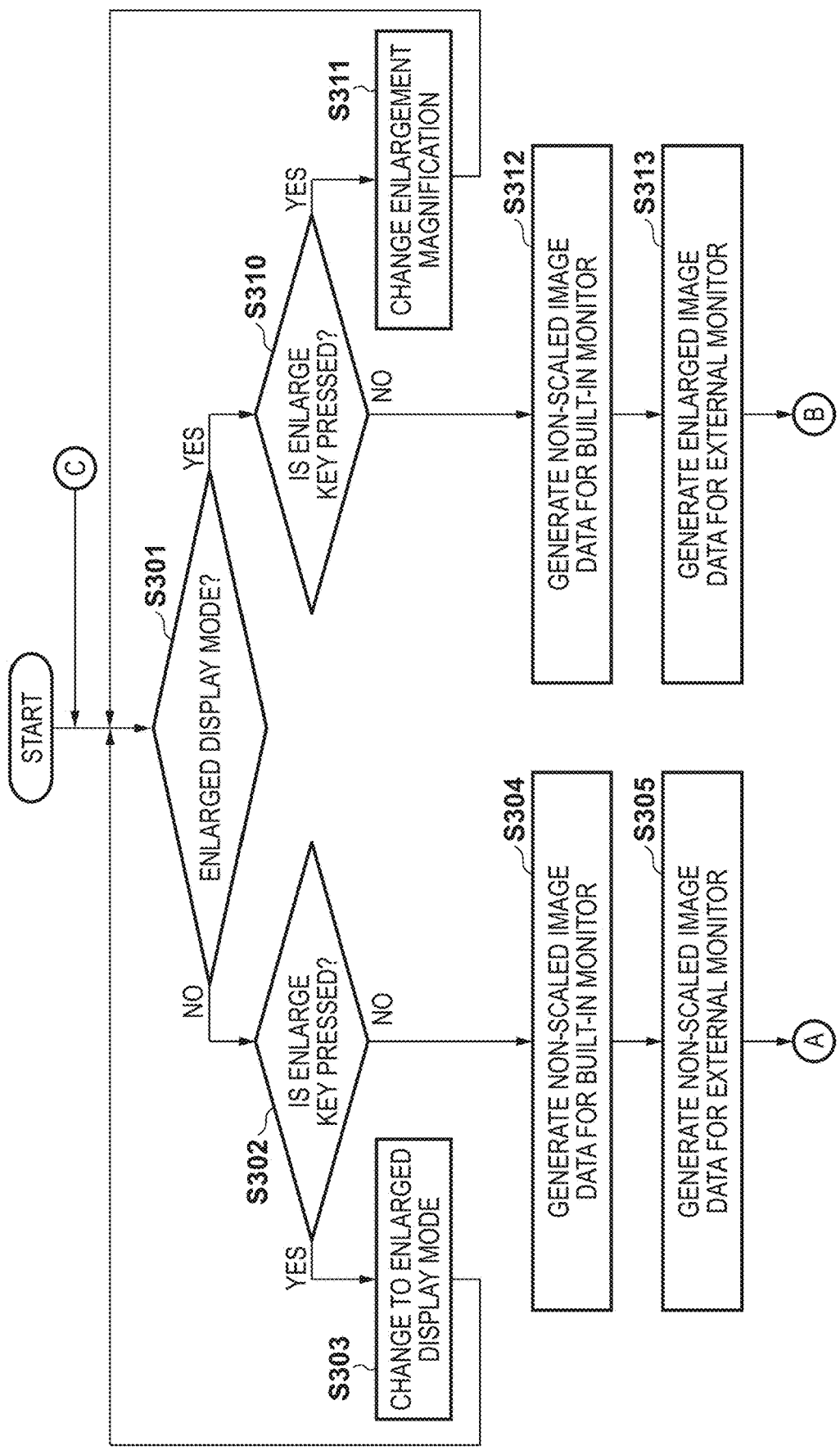
FIGS. 3A and 3B are flowcharts showing shooting mode processing according to a first embodiment.
Figure 3B:
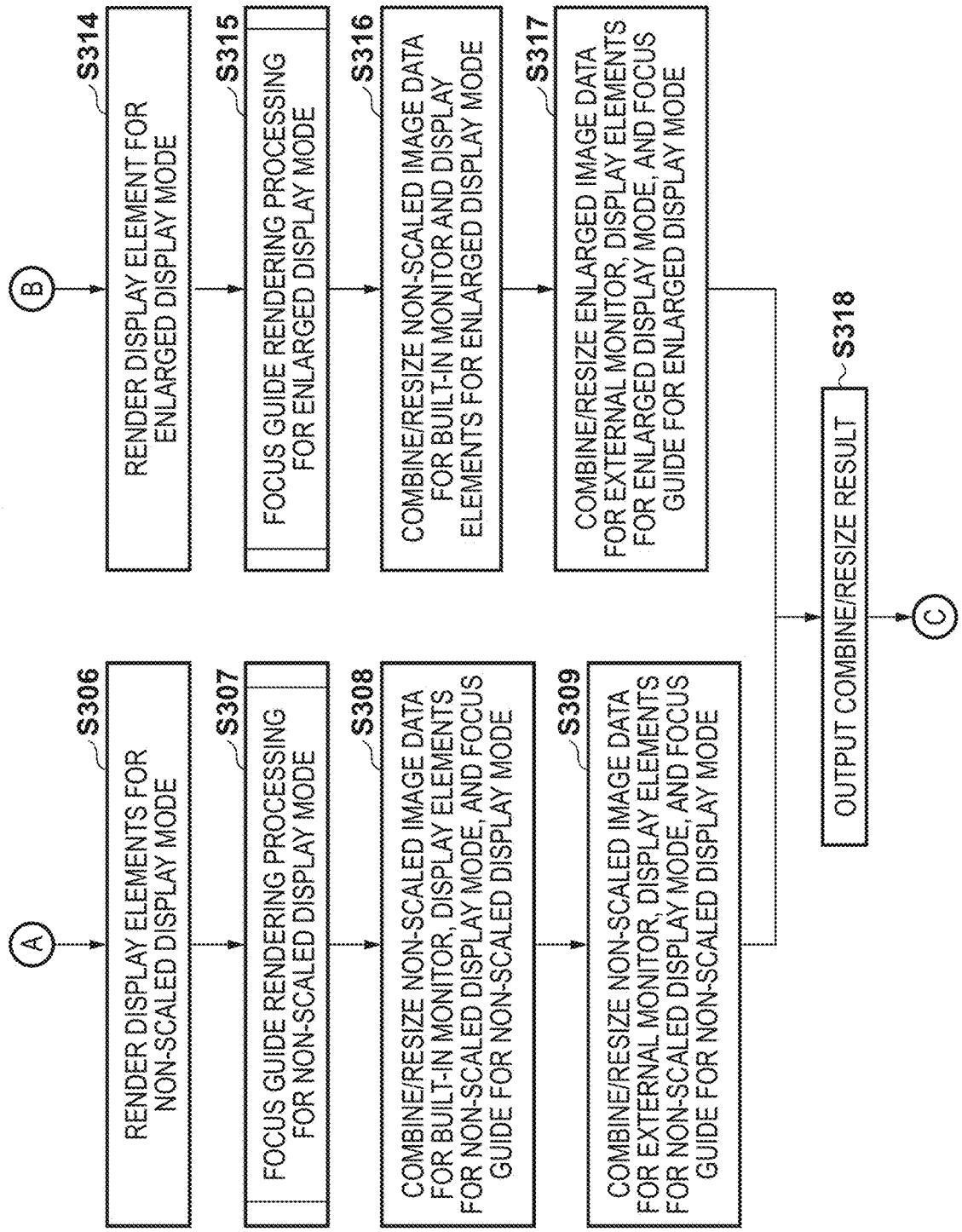

First, focus guide display processing when the digital camera 10 of this embodiment is in a shooting mode will be described with reference to FIGS. 3A and 3B. Note that the processing in FIGS. 3A and 3B are started when the digital camera 10 is started and the shooting mode is set.

In step S301, the CPU 119a determines the display mode stored in the RAM 119c, and if the display mode is the normal (non-scaled) display mode, the procedure advances to step S302, and if the display mode is the enlarged display mode, the procedure advances to step S310.

In step S302, the CPU 119a determines whether or not the enlarge key 131 has been pressed, and if the enlarge key 131 has been pressed, the procedure advances to step S303, and if the enlarge key 131 has not been pressed, the procedure advances to step S304.

In step S303, the CPU 119a changes the display mode stored in the RAM 119c to the enlarged display mode, and changes the enlargement magnification.

In step S304, the CPU 119a controls the image processing unit 118 and the display I/F unit 106 so as to generate non-scaled image data to be displayed on the display unit 107 (hereinafter, image data for the built-in monitor) based on the image formed on the image capturing element 102.

In step S305, the CPU 119a controls the image processing unit 118 and the external output I/F unit 120 so as to generate non-scaled image data for the external monitor based on the data of the captured image.

In step S306, the CPU 119a controls the GPU 115 so as to render display elements for the non-scaled display mode, in the VRAM. In step S307, the CPU 119a renders a focus guide for the non-scaled display mode in the VRAM as shown in FIGS. 4A and 4B to be described later.

Figure 5A:
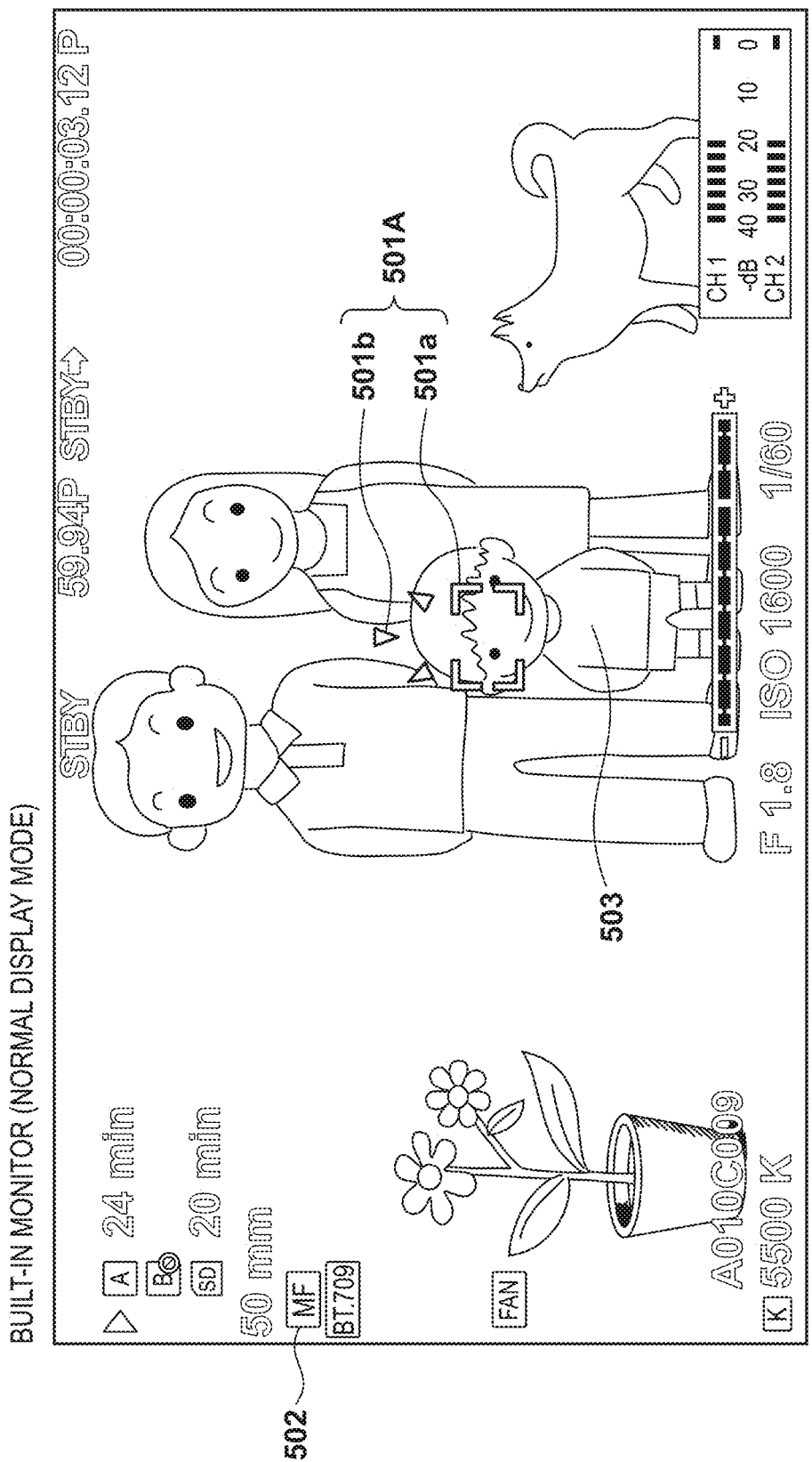
FIGS. 5A to 5C show examples of display screens according to the first embodiment.

In step S308, the CPU 119a causes the display I/F unit 106 to resize and combine the non-scaled image data to be displayed generated in step S304, data of the display elements rendered in step S306, and data of the focus guide rendered in step S307. FIG. 5A illustrates a screen that is displayed on the display unit 107 in the non-scaled display mode. A focus guide 501A includes a frame 501a and indexes 501b. An icon 502 corresponds to a display element rendered in step S306, and indicates that a focus operation has been set to MF using the AF/MF switch 135. An object 503 represents an image formed on the image capturing element 102, and is a portion of a non-scaled image data. In addition, in the screens shown in FIGS. 5A and 5B, other display elements are also displayed. These display elements are display elements rendered in step S306.

In step S309, the CPU 119a causes the external output I/F unit 120 to resize and combine the non-scaled image data for the external monitor generated in step S305, the data of the display elements rendered in step S306, and the data of the focus guide rendered in step S307. In this case, the content that is displayed on the external monitor or the like connected to the external output unit 121 is the same as the content that is displayed on the display unit 107 in step S308, except for the display resolution.

In step S310, similar to step S302, the CPU 119a determines whether or not the enlarge key 131 has been pressed, and if the enlarge key 131 has been pressed, the procedure advances to step S311, and if the enlarge key 131 has not been pressed, the procedure advances to step S312.

In step S311, the CPU 119a changes the enlargement magnification stored in the RAM 119c. If the enlargement magnification is a predetermined maximum value, the CPU 119a sets the enlargement magnification to non-magnification so as to change the display mode to the non-scaled display mode, and the procedure advances to step S301.

In step S312, similarly to step S304, the CPU 119a controls the image processing unit 118 and the display I/F unit 106 so as to generate non-scaled image data for the built-in monitor.

In step S313, the CPU 119a controls the image processing unit 118 and the external output I/F unit 120 so as to generate enlarged image data for the external monitor.

In step S314, the CPU 119a controls the GPU 115 so as to render the display elements for the enlarged display mode in the VRAM. In step S315, the CPU 119a renders the focus guide for the enlarged display mode in the VRAM as shown in FIGS. 4A and 4B to be described later.

Figure 5B:
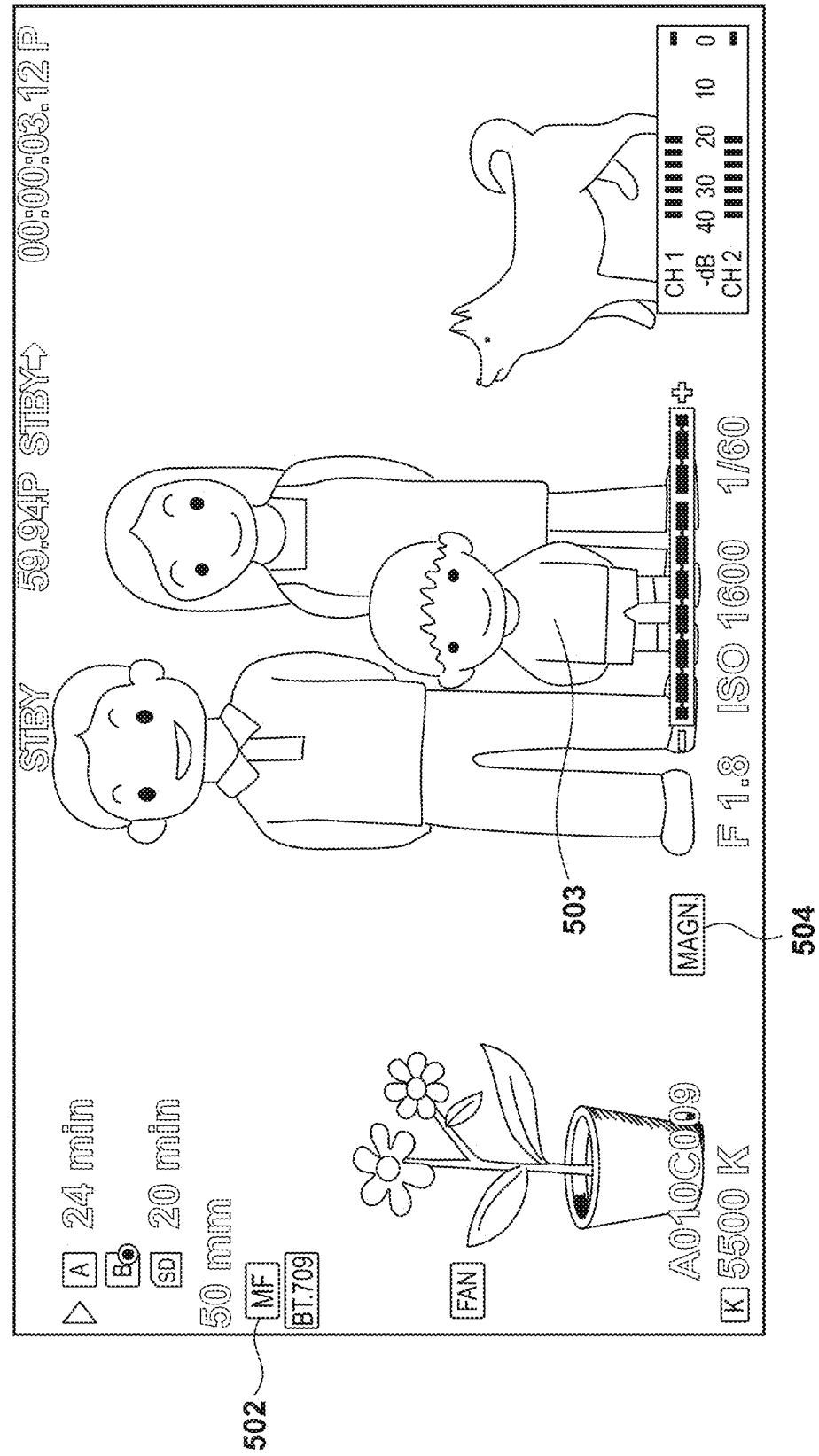

In step S316, the CPU 119a causes the display I/F unit 106 to resize and combine the non-scaled image data for the built-in monitor generated in step S312 and the data of the display elements rendered in step S314. FIG. 5B illustrates a screen that is displayed on the display unit 107 in the enlarged display mode. Since the focus guide rendered in step S315 is not generated to be combined with the non-scaled image data, the focus guide is not displayed on the screen in FIG. 5B. The icon 502 is similar to that in FIG. 5A, and is a display element rendered in step S314. The object 503 is also similar to that in FIG. 5A, and is a portion of the non-scaled image data generated in step S312. An icon 504 is a display element rendered in step S314, and indicates that the display mode is the enlarged display mode.

As described above, in the non-scaled display mode, a focus guide is displayed on both the external monitor and the display unit 107, but in the enlarged display mode, the focus guide is displayed only on the external monitor, and is not displayed on the display unit 107. In this case, the icon 504 is displayed on the display unit 107, and thus the user using the display unit 107 can recognize that the focus guide is no longer displayed on the display unit 107, since the image is displayed, in an enlarged manner, on the external monitor connected to the external output unit 121. Note that control may be performed so as to hide the focus guide on the display unit 107 when the enlargement magnification is larger than or equal to a predetermined threshold.

Figure 5C:
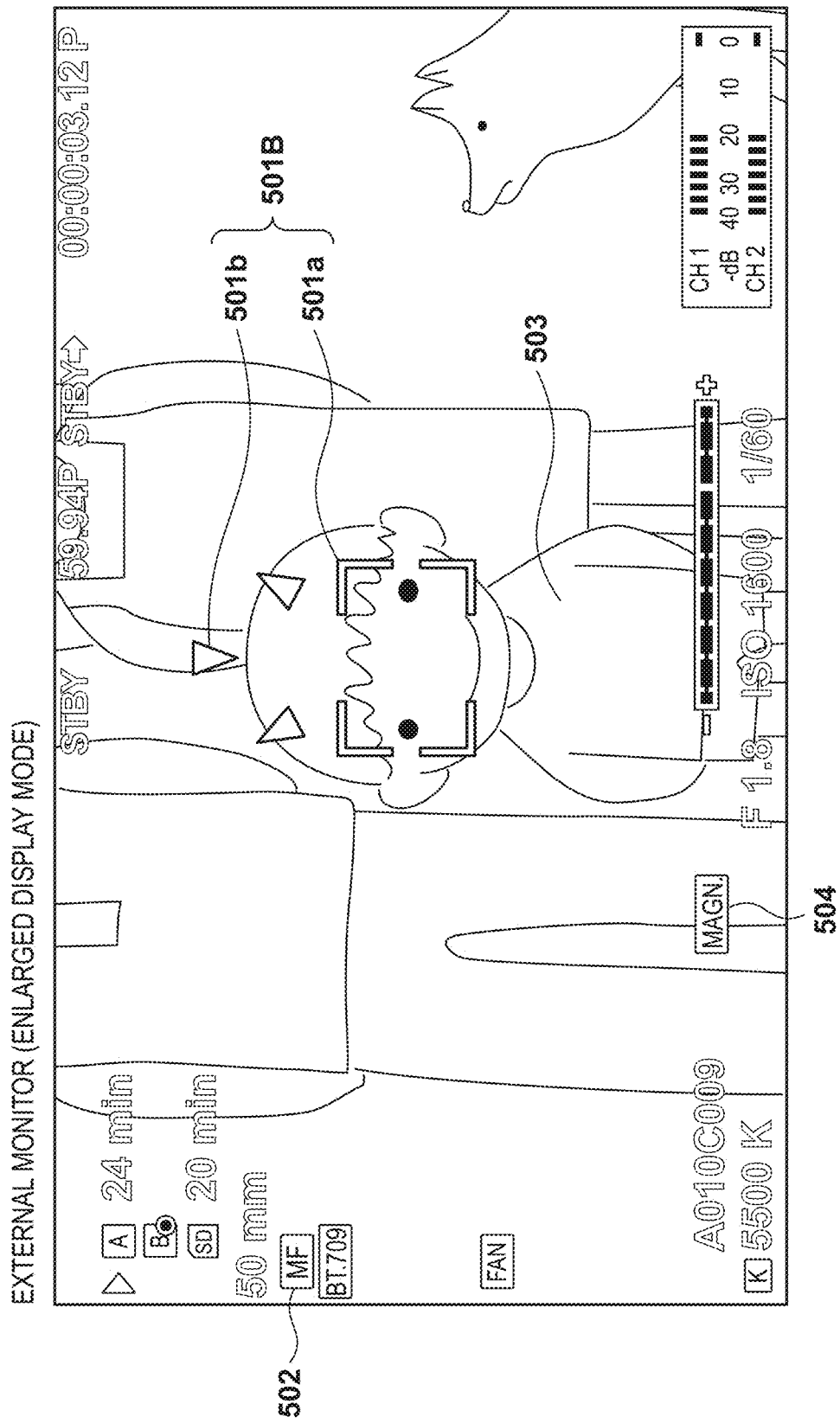

In step S317, the CPU 119a causes the external output I/F unit 120 to resize and combine the enlarged image data for the external monitor generated in step S313, the data of the display elements rendered in step S314, and the data of the focus guide rendered in step S315. FIG. 5C illustrates a screen that is displayed on the external monitor connected to the external output unit 121 in the enlarged display mode. A focus guide 501B is acquired by enlarging the focus guide 501A according to the enlarged display magnification, and includes the frame 501a and the indexes 501b. Note that the thickness of the frame and the thickness of the outlines are controlled to be equivalent to those of the focus guide 501A. Therefore, even if the focus guide 501B is displayed larger than the focus guide 501A, the visibility of the object that is displayed behind the focus guide 501B is not impaired. The icon 502 and the object 503 are similar to those in FIG. 5A. The icon 504 is also similar to that in FIG. 5B. The procedure then advances to step S318.

In step S318, the CPU 119a outputs image data resulting from combining data in step S308 and step S309 or step S316 and step S317 respectively to the display unit 107 and the external output unit 121.

FIGS. 4A and 4B are flowcharts showing detailed processing in steps S307 and S315 in FIG. 3B.

In step S401, the CPU 119a reads out focus detection information (a focus detection position and a focus detection size) stored in the RAM 119c.

In step S402, regarding an object corresponding to the focus detection information acquired in step S401, the CPU 119a acquires focusing information and information on whether or not focus detection is successful, from the focus detection unit 108. As described above, the focusing information includes information regarding whether the focus state is the in-focus state, the front-focused state, or the rear-focused state and degree-of-focus information, the information having been calculated based on the defocus amount.

In step S403, the CPU 119a determines whether or not the current display mode is the enlarged display mode, and if the current display mode is the enlarged display mode, the procedure advances to step S404, and otherwise the procedure advances to step S405.

In step S404, the CPU 119a reads out the enlargement magnification and the enlargement position stored in the RAM 119c.

In step S405, the CPU 119a determines a frame display size, a frame display position, an index angle, and a display color of the focus guide that is rendered by the GPU 115, based on the information acquired in processes up to step S404. The frame display size is determined according to the focus detection size and enlargement magnification. The frame display position is determined according to the focus detection position and the enlargement position. The index angle is determined based on the information regarding whether the focus state is the in-focus state, front-focused state, or rear-focused state, and the degree-of-focus information in the case of the front-focused state or rear-focused state. The display color is determined based on the information regarding whether the focus state is the in-focus state, front-focused state, or rear-focused state, and the information on whether or not focus detection is successful. A detailed description will be given later.

In step S406, the CPU 119a determines whether or not focus detection is successful, by referencing the information on whether or not focus detection is successful, the information having been acquired in step S402, and if the focus detection is successful, the procedure advances to step S407, and if the focus detection failed, the procedure advances to step S412.

In step S407, the CPU 119a determines, regarding the information acquired in step S402, whether or not the object is in the in-focus state, and if the object is in the in-focus state, the procedure advances to step S409, and if the object is not in the in-focus state, the procedure advances to step S408.

In step S408, the CPU 119a determines, regarding the information acquired in step S402, whether the object is in the front-focused state or the rear-focused state, and if the object is in the front-focused state, the procedure advances to step S410, and if the object is in the rear-focused state, the procedure advances to step S411.

Figure 6A:
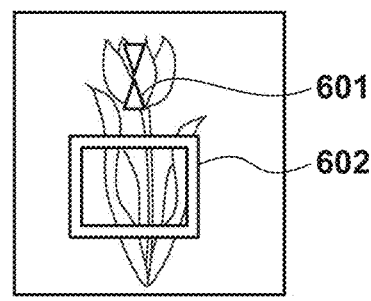

In step S409, the CPU 119a selects data of a focus guide corresponding to an index pattern A that is a display appearance in the case where the object is in the in-focus state. FIG. 6A shows a display example of data of a frame and indexes of the focus guide in the case of the index pattern A. An index 601 indicates the in-focus state (a state where an object in the focal point detection region is in focus), and an index 604 and an index 605, which will be described later, overlap and are integrated with each other, and are at a position adjacent to an index 603 (the position indicated by the index 603). In addition, the indexes and frame are displayed in green, which is different from the other states. By adopting this display appearance, in a region in and close to the in-focus state, the display area of indexes is smaller than in the other states, and thus it is possible to reduce the influence on the user visibility of the image. A frame 602 indicates a region corresponding to the focus detection position acquired in step S401 with respect to the live view image.

In step S410, the CPU 119a selects data of a focus guide corresponding to an index pattern B that is a display appearance when the object is in the front-focused state. FIGS. 6B1 and 6B2 each show a display example of data of a frame and indexes of the focus guide in the case of the index pattern B. The index 603 indicates a target point of the index 604 and the index 605 for approaching the in-focus state, and is expressed as a white triangle directed toward the frame 602. The display distance between the index 604 and the index 605 indicates the degree of focus of a region corresponding to the focus detection position, and the index 604 and the index 605 are each expressed as a triangle facing toward a side away from the frame 602. If the distance between the object and the digital camera 10 changes, the degree of focus changes, and thus the space between the index 604 and the index 605 narrows and widens, changing the display positions dynamically. The distance (angle) between the index 604 and the index 605 changes such that the display distance in a case where deviation from focus in the focal point detection region is small is smaller (narrower, or the angle is smaller) than the display distance in a case where deviation from focus in the focal point detection region is large, based on the degree-of-focus information. In other words, FIG. 6B1 shows a case where the object is blurred in a relatively small amount (the degree of out-of-focus is small), and FIG. 6B2 shows a case where the object is blurred in a relatively large amount (the degree of out-of-focus is large). Since the index 603, the index 604, and the index 605 are triangles, and an apex of each triangle faces an apex of each of the other triangles in the vicinity of the in-focus position, it is easy to visually recognize even slight deviation from the in-focus state. In addition, the indexes 603 to 605 are displayed in the vicinity of the frame 602, and thus the photographer can check the in-focus state without significantly averting their eyes from the object. In addition, even in the case where focus guides can be displayed for a plurality of positions at the same time, the link between a frame and corresponding indexes can be easily recognized.

In step S411, the CPU 119a selects data of a focus guide corresponding to an index pattern C that is a display appearance in the case where the object is in the rear-focused state. FIGS. 6C1 and 6C2 each show a display example of data of a frame and indexes in the case of the index pattern C. Unlike FIGS. 6B1 and 6B2, the index 603 is expressed as a white triangle facing toward a side away from the frame 602, and the index 604 and the index 605 are expressed as triangles directed toward the frame 602. Therefore, the display appearance makes it possible to immediately determine whether the state is the front-focused state or the rear-focused state. FIG. 6C1 shows a case where the object is blurred in a relatively small amount (the degree of out-of-focus is small), and FIG. 6C2 shows a case where the object is blurred in a relatively large amount (the degree of out-of-focus is large).

Figure 6D:
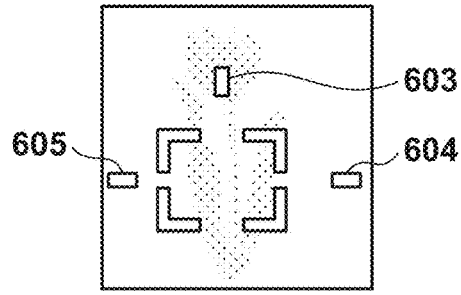

In step S412, the CPU 119a selects data of a focus guide corresponding to an index pattern D that is a display appearance in the case where the object is blurred in a large amount. FIG. 6D shows a display example of data of a frame and indexes in the case of the index pattern D. The index 603, the index 604, and the index 605 are each expressed as a rectangle, and have a shape different from the indexes shown in FIGS. 6A, 6B1, 6B2, 6C1, and 6C2. In addition, the index 603, the index 604, and the index 605 are displayed in gray. This visually indicates a largely blurred state in which determination as to whether the state is the front-focused state or rear-focused state having been failed (in other words, focus detection failed).

In step S413, the CPU 119a causes the GPU 115 to render, in the VRAM, the display content of indexes and a frame selected in one of steps S409 to S412, in accordance with the frame display position, frame size, index angle, and display color determined in step S405.

In this embodiment, the display content of a focus guide and display elements is rendered in the same VRAM. Accordingly, even if only one VRAM can be used for rendering the focus guide due to processing performance, restriction on the capacity of the VRAM, and the like, both an enlarged image and the focus guide can be displayed on the external monitor.

In addition, a focus guide is not displayed on the display unit 107 on which an image is not displayed in an enlarged manner, but the image can be displayed according to the focusing state without causing image failure. In addition, since the image is displayed in an enlarged manner on the external monitor connected to the external output unit 121, the user using the display unit 107 can recognize that the focus guide is no longer displayed on the display unit 107 due to the icon 504 being displayed.

Note that, in this embodiment, a description has been given in which a monitor on which enlarged display is performed in the enlarged display mode is the external monitor, and a monitor on which non-scaled display is performed is the built-in monitor, but a monitor on which enlarged display is performed and a monitor on which non-scaled display is performed may be reversed according to a shooting usage, a shooting method, or the like. In addition, a configuration may be adopted in which the user can select, through menu settings of the digital camera 10, which monitor is to be used for enlarged display. If the digital camera 10 is provided with a third image output device such as a viewfinder, a focus guide may be displayed on one or two out of the three output devices.

Second Embodiment

Next, a second embodiment will be described.

A hardware configuration of this embodiment is similar to the first embodiment. Note that the VRAM in the RAM 119*c* has sufficient capacity for displaying different focus guides for the display unit 107 and the external output unit 121. Also, the performance of the GPU 115 and other processing blocks related to rendering in the VRAM is sufficient for displaying different focus guides on the display unit 107 and the external output unit 121.

Focus Guide Display Processing

Figure 7A:
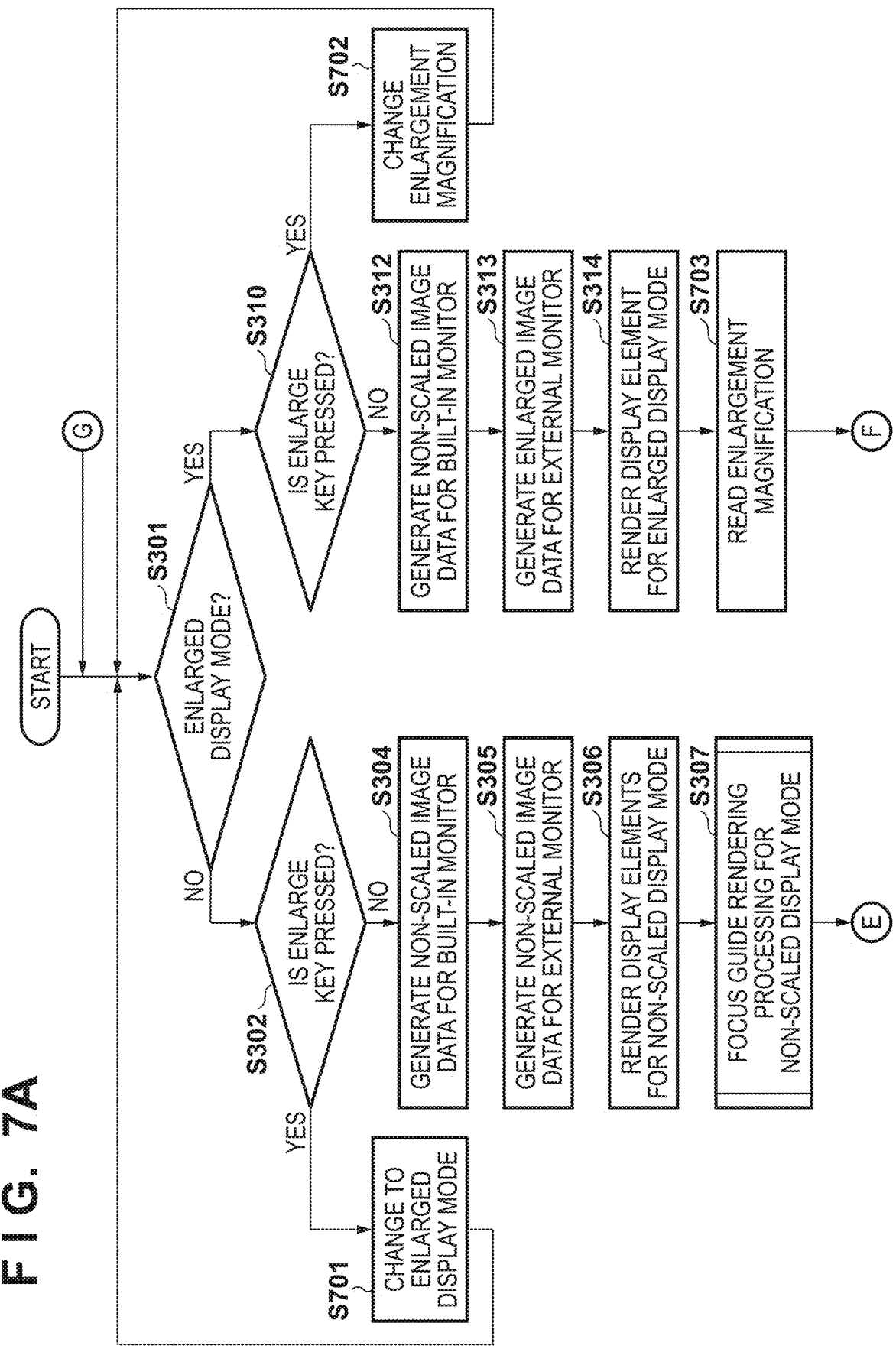
FIGS. 7A and 7B are flowcharts showing shooting mode processing according to a second embodiment.
Figure 7B:
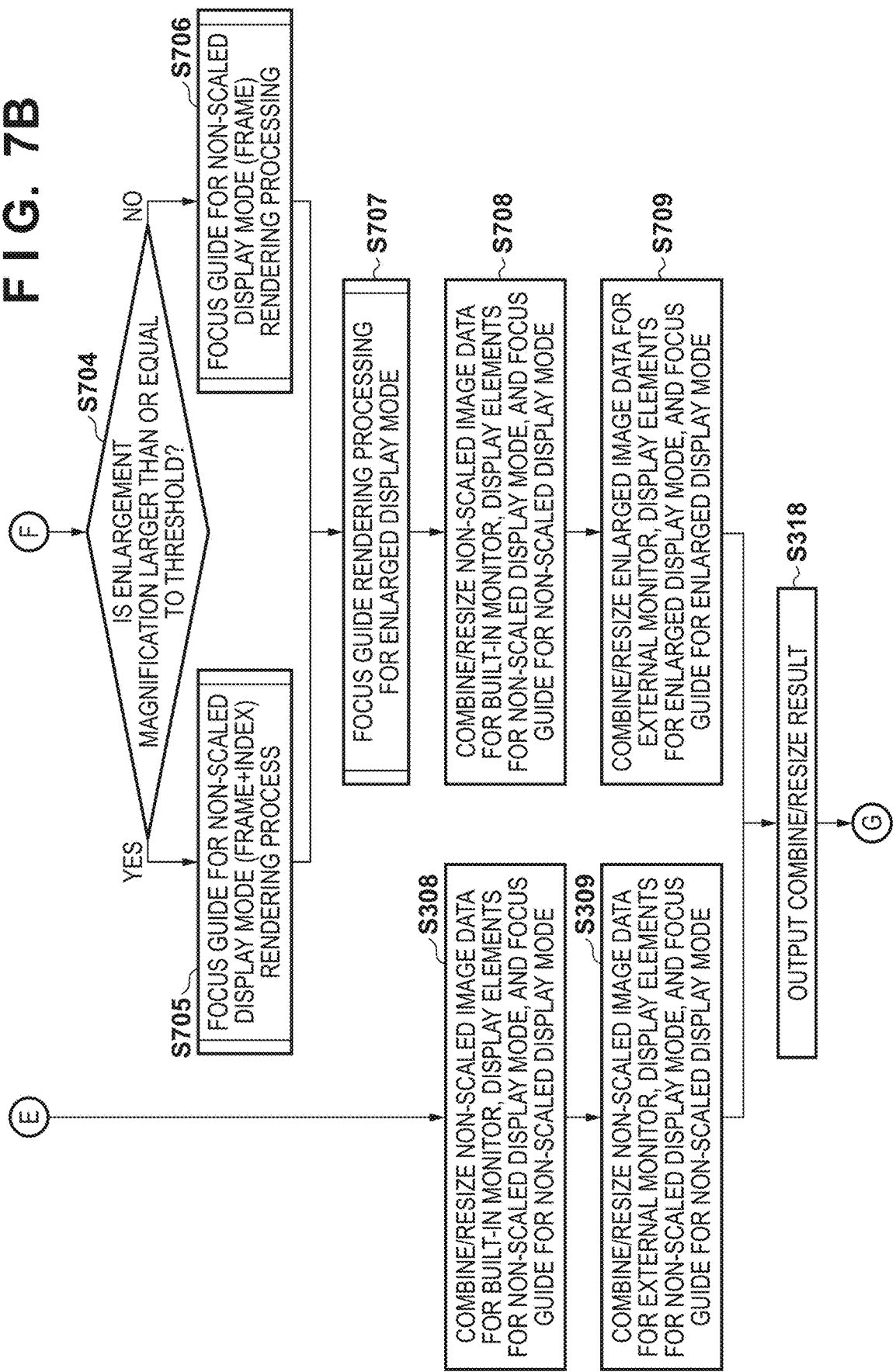

First, focus guide display processing when the digital camera 10 of this embodiment is in a shooting mode will be described with reference to FIGS. 7A and 7B. Note that the processing in FIGS. 7A and 7B is started when the digital camera 10 is started and the shooting mode is set.

Note that, in FIGS. 7A and 7B, the same reference numerals are assigned to processes similar to those in FIGS. 3A and 3B, and description will be given with focusing on processes different from those in FIGS. 3A and 3B.

In step S701, the CPU 119*a* changes the display mode stored in the RAM 119*c* to an enlarged display mode so as to change the enlargement magnification, and then the procedure advances to step S301. In this case, a focus detection size that is stored in the RAM 119*c* is changed to a value smaller than that for a non-scaled display mode according to the enlargement magnification.

In step S702, the CPU 119*a* changes the enlargement magnification stored in the RAM 119*c* so as to change the focus detection size to a value corresponding to the enlargement magnification. In addition, if the enlargement magnification is a predetermined maximum value, the CPU 119*a* changes the enlargement magnification to non-magnification, changes the focus detection size to a value for the non-scaled display mode, and changes the display mode stored in the RAM 119*c* to the non-scaled display mode, and the procedure advances to step S301.

In step S703, the CPU 119*a* reads out the enlargement magnification stored in the RAM 119*c*.

In step S704, the CPU 119*a* determines whether or not the enlargement magnification acquired in step S703 is larger than or equal to a predetermined threshold, and if the enlargement magnification is larger than or equal to the predetermined threshold, the procedure advances to step S705, and if the enlargement magnification is smaller than the predetermined threshold, the procedure advances to step S706.

In step S705, the CPU 119*a* renders a focus guide for non-scaled display in the enlarged display mode, in the VRAM. This rendering processing is the same as the processing shown in FIGS. 4A and 4B, but since the focus detection size has been changed, the display appearance of the rendered focus guide is different from that rendered in step S307. This focus guide will be described later in detail.

Figure 8:
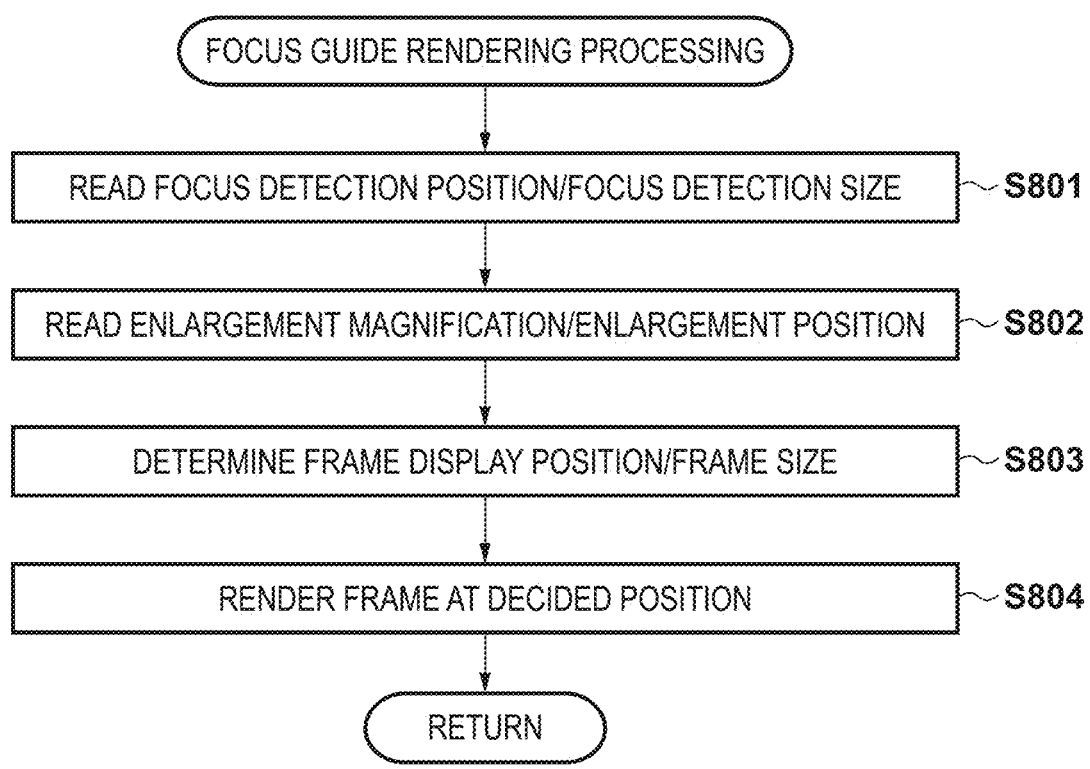
FIG. 8 is a flowchart showing focus guide rendering processing of FIGS. 7A and 7B.

In step S706, the CPU 119*a* renders, in the VRAM, a focus frame for non-scaled display in the enlarged display mode as shown in FIG. 8 to be described later.

In step S707, similar to step S315, the CPU 119*a* renders, in the VRAM, a focus guide for the enlarged display mode as shown in FIGS. 4A and 4B.

Figure 9A:
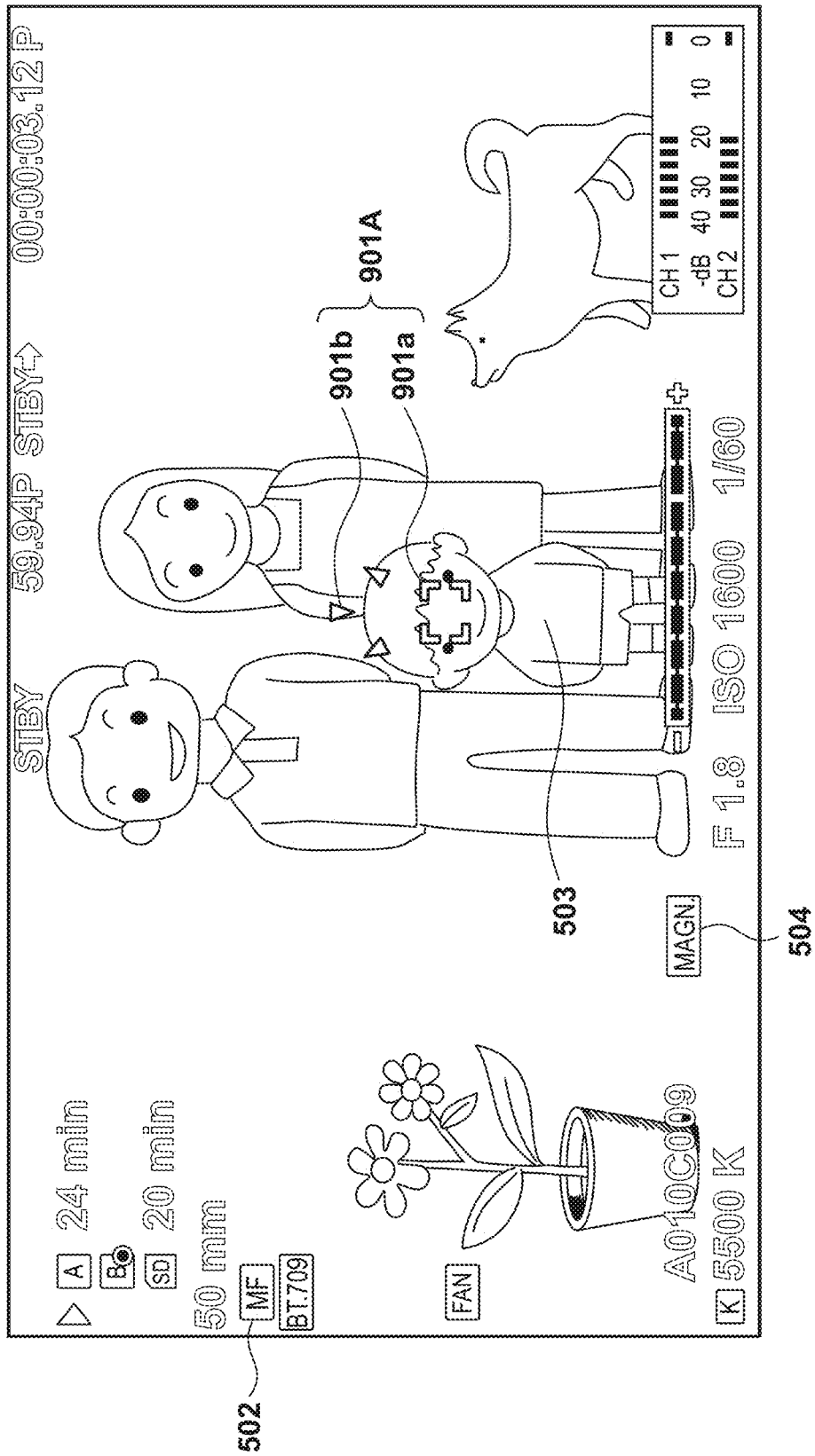
Figure 9B:
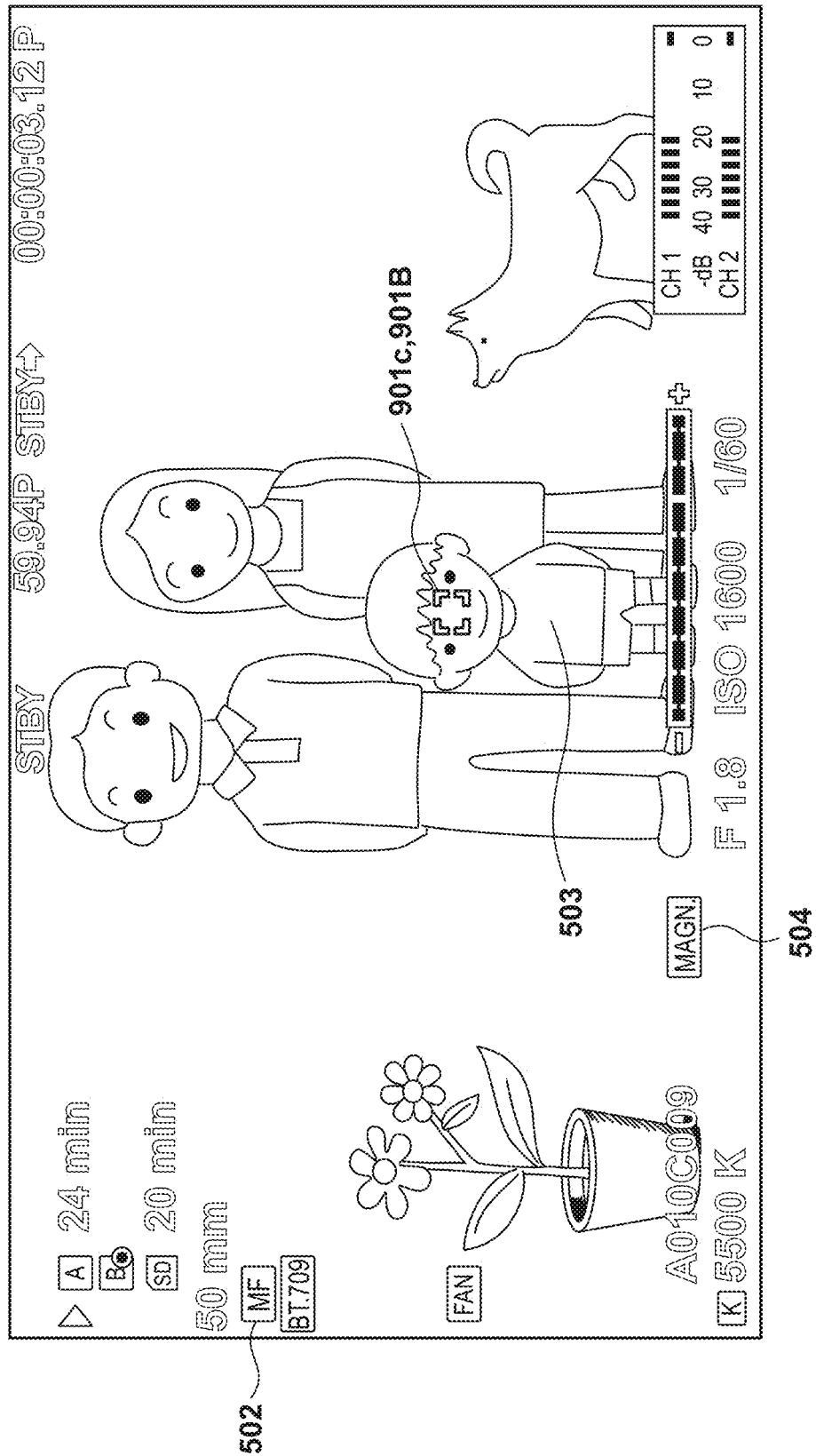

In step S708, the CPU 119*a* causes the display I/F unit 106 to resize and combine the non-scaled image data for the built-in monitor generated in step S312, data of the display elements rendered in step S314, and data of the focus guide rendered in step S705 or step S706. FIGS. 9A and 9B illustrate a screen that is displayed on the display unit 107 in the enlarged display mode. In FIGS. 9A and 9B, the same numerals are assigned to elements that are the same as those in FIG. 5A. A focus guide 901A shown in FIG. 9A is the focus guide rendered in step S705. A focus guide 901B shown in FIG. 9B is the focus guide rendered in step S706. A region surrounded by a frame 901*a* of the focus guide 901A is smaller than a region surrounded by the frame 501*a* of the focus guide 501A in FIG. 5A, in accordance with the focus detection size changed in step S702. In addition, the size of an index 901*b* of the focus guide 901A is equivalent to the size of the index 501*b* of the focus guide 501A, and the visibility of the index 901*b* as a guide is maintained. In the focus guide 901B shown in FIG. 9B, the index 901*b* in FIG. 9A is not displayed, and only a frame 901*c* changed according to the focus detection size is displayed. Both the frame 901*a* of the focus guide 901A and the frame 901*c* of the focus guide 901B are controlled such that the thickness of the frames and the thickness of the outlines are equivalent to those in the focus guide 501A in FIG. 5A. Therefore, if the frame 901*a* of the focus guide 901A and the frame 901*c* of the focus guide 901B are displayed smaller than the frame 501*a* of the focus guide 501A in FIG. 5A, their visibility as a frame is maintained.

In step S709, the CPU 119*a* causes the external output I/F unit 120 to resize and combine the enlarged image data for the external monitor generated in step S313, data of the display elements rendered in step S314, and data of the focus guide rendered in step S707. FIG. 9C illustrates a screen that is displayed on the external monitor connected to the external output unit 121, in the enlarged display mode. A focus guide 901C is the focus guide rendered in step S707. In the focus guide 901C, the sizes of a frame 901*d* and an index 901*e* are reduced in accordance with the focus detection size changed in step S702. In addition, the size and position of the frame 901*c* of the focus guide 901C relative to the image data resulting from combining the data are equivalent to those of the focus guides 901A and 901B. In addition, the frame 901*d* of the focus guide 901C is included in the frame 501*a* of the focus guide 501A in FIG. 5A, and a region in which the size of the frame 901*d* relative to the entire image is smaller than the size of the frame 501*a* of the focus guide 501A is displayed in an enlarged manner. In addition, the display appearance of the focus guide 901C (the frame 901*d*+the index 901*e*) that is displayed on the external monitor is different from the display appearance of the focus guide 901B (only the frame 901*c*) that is displayed on the display unit 107.

FIG. 8 is a flowchart showing the processing in step S706 in FIG. 7B in detail.

In step S801, the CPU 119a reads out focus detection information (focus detection position and focus detection size) stored in the RAM 119c.

In step S802, the CPU 119a reads out an enlargement magnification and an enlargement position stored in the RAM 119c.

In step S803, the CPU 119a determines a display size and display position of a focus frame that is rendered by the GPU 115, based on the information acquired in steps S801 and S802.

In step S804, the CPU 119a causes the GPU 115 to render, in the VRAM, data of the focus frame to be displayed, in accordance with the display size and the frame display position determined in step S803.

By performing the above processing, data of only a frame portion can be rendered in the VRAM without rendering an index that functions as a focus guide.

As described above, according to this embodiment, in the external monitor that is used for focus checking, the degree of out-of-focus of a smaller region can be indicated using a focus guide in accordance with the enlarged display. Therefore, as the enlargement magnification increases, the degree of out-of-focus of a more local region can be checked using the focus guide. On the other hand, on the display unit 107 on which enlarged display is not performed, if the enlargement magnification is lower than the threshold value, the degree of out-of-focus of a local region can be checked using a focus guide, similarly to the external monitor. In addition, the smaller the focus detection size is, the smaller the frame portion of the focus guide is, but the size of an index portion is maintained, and thus it is possible maintain its function as a guide. In addition, a configuration can be adopted in which, when the enlargement magnification is larger than or equal to the predetermined threshold, it is possible to check, on the display unit 107, for example, where in the image the focus puller using the external monitor is in focus, by displaying only the frame of a focus guide. In addition, the assistant using the display unit 107 can instruct, using the cross key 125 or the like, the focus puller using the external monitor, where in the image they want to be in focus.

Note that, in this embodiment, a description has been given in which a monitor on which enlarged display is performed in the enlarged display mode is the external monitor and a monitor on which non-scaled display is performed is the built-in monitor, but a monitor on which enlarged display is performed and a monitor on which non-scaled display is performed may be reversed according to a shooting usage, a shooting method, or the like. In addition, a configuration may be adopted in which the user can select which monitor is to be used to perform enlarged display, through menu settings of the digital camera 10. If the digital camera 10 has a third image output device such as a viewfinder, a configuration may be adopted in which enlarged display is performed on one or two out of the three output devices, and non-scaled display is performed on the one or two remaining output devices.

Note that, when the enlargement magnification is larger than or equal to the predetermined threshold, control may be performed so as to not display the entire focus guide on the display unit 107. With such a configuration, in a system in which processing loads of the constituent elements of the digital camera 10 increase due to enlargement magnification, it is possible to reduce the rendering data amount and the combining processing load on the VRAM, and to maintain balance of processing loads.

OTHER EMBODIMENTS

In the above-described embodiment, the above-described various kinds of control described as being performed by the CPU 119a may be performed by a single item of hardware, or control of the entire apparatus may be performed by a plurality of items of hardware (for example, a plurality of processors and circuits) sharing processing of the control.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

In addition, in the above embodiments, a case has been described as an example, in which the present invention is applied to the digital camera 10, but the present invention is not limited to this example, and can be applied to any electronic apparatus that has a plurality of image output devices, can perform enlarged display on the image output devices, and can display a focus guide. Accordingly, the present invention can be applied to apparatuses that have a camera function such as personal computers, tablets that are a type of personal computer, mobile phones, and smartphones (including eyewear-type terminals and watch-type terminals) that are a type of mobile phone, and PDAs (mobile information terminals), portable image viewers, digital photo frames, music players, game machines, electronic book readers, medical apparatuses, and the like.

In addition, the present invention can be applied to not only a camera itself but also a control apparatus that communicates with a camera (including a network camera) via wired or wireless communication, and remotely controls the camera. Examples of such an apparatus that remotely control a camera include apparatuses such as smartphones, tablet PCs, and desktop PCs. It is possible to remotely control a camera by notifying, from the control apparatus, the camera of a command to perform various operations and settings, based on an operation performed on the control apparatus side and processing performed on the control apparatus side. In addition, a configuration may be adopted in which a live view image shot using a camera is received via wired or wireless communication, and displayed by the control apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-074987, filed Apr. 9, 2018 which is hereby incorporated by reference herein in its entirety.

What is claimed is:

1. An electronic apparatus comprising:
a first output unit configured to output an image to a first display unit;
a second output unit configured to output an image to a second display unit; and
a memory and at least one processor and/or at least one circuit which function as:
a control unit configured to,
if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and
if a live view image is displayed in an enlarged manner on the first display unit, perform control so as to output, to the first display unit, an image acquired by enlarging a partial region in the live view image that includes the focus detection region and superimposing the guide on the enlarged image, and output, to the second display unit, the live view image on which the guide is not superimposed.

2. The apparatus according to claim 1, wherein
when an enlargement magnification is larger than or equal to a predetermined threshold, the control unit performs control so as to not display the guide on the second display unit.

3. The apparatus according to claim 1, wherein
if the live view image is displayed in an enlarged manner on the first display unit, the control unit performs control so as to output, to both the first display unit and the second display unit, an image acquired by superimposing a display element indicating that enlarged display is being performed, on the live view image.

4. The apparatus according to claim 1, wherein
the control unit performs control so as to output, to both the first display unit and the second display unit, an image acquired by superimposing a display element related to a focus operation, on a live view image, regardless of whether or not enlarged display is being performed.

5. The apparatus according to claim 1, wherein
if the live view image is displayed in an enlarged manner on the first display unit, the control unit performs control so as to
enlarge the live view image according to an enlargement magnification, and output the enlarged live view image to the first display unit, and
output, to the second display unit, the live view image that is not enlarged.

6. The apparatus according to claim 3, wherein
data for displaying the guide and the display element is held in a common VRAM.

7. The apparatus according to claim 1, wherein
the guide includes a frame indicating a position of the focus detection region and an index indicating a focus state of the focus detection region, and
a display appearance of the index is different according to the focus state.

8. The apparatus according to claim 7, wherein
the control unit performs control so as to change a size of the guide according to an enlargement magnification,
when the enlargement magnification is larger than or equal to a predetermined threshold, display the frame and the index as the guide on the second display unit, and
if the enlargement magnification is smaller than the predetermined threshold, display only the frame as the guide on the second display unit.

9. The apparatus according to claim 1, wherein
the first display unit is a display device connected to the electronic apparatus as an external apparatus, and
the second display unit is a display device provided in the electronic apparatus.

10. The apparatus according to claim 1, further comprising:
an image sensor that captures the live view image.

11. An electronic apparatus comprising:
a first output unit configured to output an image to a first display unit;
a second output unit configured to output an image to a second display unit; and
a memory and at least one processor and/or at least one circuit which function as:
a control unit configured to,
if a live view image is not displayed in an enlarged manner on the first display unit and the second display unit, perform control so as to output, to both the first display unit and the second display unit, an image acquired by superimposing, on the live view image, a guide indicating a degree of focus of a focus detection region of a first size, and
if a live view image is displayed in an enlarged manner on the first display unit, perform control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

12. The apparatus according to claim 11, wherein
if the live view image is displayed in an enlarged manner on the first display unit, the control unit performs control so as to
output, to the first display unit, an image acquired by enlarging a partial region in the live view image that includes the focus detection region of the second size, and superimposing a guide of the focus detection region of the second size on the enlarged image in a first display appearance, and
output, to the second display unit, an image acquired by superimposing the guide of the focus detection region of the second size on the live view image in a second display appearance that is different from the first display appearance.

13. The apparatus according to claim 11, wherein
the guide includes a frame indicating a position of the focus detection region and an index indicating a focus state of the focus detection region, and
if a live view image is displayed in an enlarged manner on the first display unit, the control unit performs control so as to change a size of the frame to the second size, and to not change a size of the index.

14. An electronic apparatus comprising:
a first output unit configured to output an image to a first display unit;
a second output unit configured to output an image to a second display unit; and
a memory and at least one processor and/or at least one circuit which function as:
a control unit
configured to,
if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and
if the live view image is displayed in an enlarged manner on the first display unit, perform control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

15. A method of controlling an electronic apparatus having a first output unit configured to output an image to a first display unit and a second output unit configured to output an image to a second display unit, the method comprising:
if a live view image is not displayed in an enlarged manner on the first display unit and the second display unit, performing control so as to output, to both the first display unit and the second display unit, an image acquired by superimposing a guide indicating a degree of focus of a focus detection region, on the live view image; and
if a live view image is displayed in an enlarged manner on the first display unit, performing control so as to output, to the first display unit, an image acquired by enlarging a partial region in the live view image that includes the focus detection region and superimposing the guide on the enlarged image, and output, to the second display unit, the live view image on which the guide is not superimposed.

16. A method of controlling an electronic apparatus having a first output unit configured to output an image to a first display unit and a second output unit configured to output an image to a second display unit, the method comprising:
if a live view image is not displayed in an enlarged manner on the first display unit and the second display unit, performing control so as to output, to both the first display unit and the second display unit, an image acquired by superimposing, on the live view image, a guide indicating a degree of focus of a focus detection region of a first size; and
if a live view image is displayed in an enlarged manner on the first display unit, performing control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

17. A method of controlling an electronic apparatus having a first output unit configured to output an image to a first display unit and a second output unit configured to output an image to a second display unit, the method comprising:
if a live view image is not displayed in an enlarged manner on the first display unit and the second display unit, performing control so as to output, to both the first display unit and the second display unit, an image acquired by superimposing a guide indicating a degree of focus of a focus detection region, on the live view image; and
if the live view image is displayed in an enlarged manner on the first display unit, performing control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

18. A non-transitory computer-readable storage medium storing a program for causing a computer to function as an electronic apparatus comprising:
a first output unit configured to output an image to a first display unit;
a second output unit configured to output an image to a second display unit; and
a control unit configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and
if a live view image is displayed in an enlarged manner on the first display unit, perform control so as to output, to the first display unit, an image acquired by enlarging a partial region in the live view image that includes the focus detection region and superimposing the guide on the enlarged image, and output, to the second display unit, the live view image on which the guide is not superimposed.

19. A non-transitory computer-readable storage medium storing a program for causing a computer to function as an electronic apparatus comprising:
a first output unit configured to output an image to a first display unit;
a second output unit configured to output an image to a second display unit; and
a control unit configured to, if a live view image is not displayed in an enlarged manner on the first display unit and the second display unit, perform control so as to output, to both the first display unit and the second display unit, an image acquired by superimposing, on the live view image, a guide indicating a degree of focus of a focus detection region of a first size, and if a live view image is displayed in an enlarged manner on the first display unit, perform control so as to output, to the first display unit, an image acquired by enlarging a partial region that includes a focus detection region that is included in the focus detection region of the first size, and whose size relative to the entire live view image is a second size that is smaller than the first size, and superimposing a guide indicating a degree of focus of the focus detection region of the second size, on the enlarged image.

20. A non-transitory computer-readable storage medium storing a program for causing a computer to function as an electronic apparatus comprising:

a first output unit configured to output an image to a first display unit;

a second output unit configured to output an image to a second display unit; and a control unit configured to, if a live view image is not displayed in an enlarged manner on the first display unit and the second display unit, perform control so as to output, to both the first display unit and the second display unit, an image acquired by superimposing a guide indicating a degree of focus of a focus detection region, on the live view image, and if the live view image is displayed in an enlarged manner on the first display unit, perform control so as to output, to the first display unit, an image acquired by enlarging a partial region of the live view image that includes the focus detection region, and superimposing the guide on the enlarged image in a first display appearance, and output, to the second display unit, an image acquired by superimposing the guide on the live view image in a second display appearance that is different from the first display appearance.

* * * * *